United States Patent
Kim et al.

(10) Patent No.: US 10,585,228 B2
(45) Date of Patent: Mar. 10, 2020

(54) QUANTUM DOTS, PRODUCTION METHODS THEREOF, AND ELECTRONIC DEVICES INCLUDING THE SAME

(71) Applicant: Samsung Electronics Co., Ltd., Suwon-si, Gyeonggi-do (KR)

(72) Inventors: Tae Hyung Kim, Seoul (KR); Jihyun Min, Seoul (KR); Yongwook Kim, Suwon-si (KR); Eun Joo Jang, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 350 days.

(21) Appl. No.: 15/393,632

(22) Filed: Dec. 29, 2016

(65) Prior Publication Data
US 2017/0186922 A1 Jun. 29, 2017

(30) Foreign Application Priority Data
Dec. 29, 2015 (KR) .................. 10-2015-0189007

(51) Int. Cl.
*G02F 1/1335* (2006.01)
*F21V 8/00* (2006.01)
(Continued)

(52) U.S. Cl.
CPC ............ *G02B 6/005* (2013.01); *C09K 11/665* (2013.01); *C09K 11/703* (2013.01); *C09K 11/88* (2013.01);
(Continued)

(58) Field of Classification Search
CPC ......... G02F 1/133514; G02F 1/133621; G02F 2001/133614; G02F 2202/36;
(Continued)

(56) References Cited

U.S. PATENT DOCUMENTS 6,429,318 B1  8/2002  Mitzi
7,641,815 B2  1/2010  Varadarajan et al.
(Continued)

FOREIGN PATENT DOCUMENTS

CN  104861958 A  *  8/2015
KR  101544317 B1     8/2015

OTHER PUBLICATIONS

Loredana Protesescu, et al., "Nanocrystals of Cesium Lead Halide Perovskites (CsPbX3, X=Cl, Br, and I): Novel Optoelectronic Materials Showing Bright Emission with Wide Color Gamut", Nano Letters, 2015, 15 (6), pp. 3692-3696.
(Continued)

*Primary Examiner* — John A McPherson
(74) *Attorney, Agent, or Firm* — Cantor Colburn LLP

(57) ABSTRACT

An electronic device includes, a light source having a peak emission at a wavelength between about 440 nm to about 480 nm; and a photoconversion layer disposed on the light source,
wherein the photoconversion layer includes a first quantum dot which emits red light and a second quantum dot which emits green light,
wherein at least one of the first quantum dot and the second quantum dot has a perovskite crystal structure and includes a compound represented by Chemical Formula 1:

$$AB'X_{3+\alpha} \quad \text{Chemical Formula 1}$$

wherein A is a Group IA metal, $NR_4^+$, or a combination thereof, B' is a Group IVA metal, X is a halogen, $BF_4^-$, or a combination thereof, and $\alpha$ is 0 to 3.

20 Claims, 24 Drawing Sheets

(51) Int. Cl.
  *C09K 11/70* (2006.01)
  *C09K 11/88* (2006.01)
  *C09K 11/66* (2006.01)

(52) U.S. Cl.
  CPC .............. *G02F 1/133514* (2013.01); *G02F 2001/133614* (2013.01); *G02F 2202/36* (2013.01)

(58) Field of Classification Search
  CPC ............ G02F 1/133617; C09K 11/665; C09K 11/703; C09K 11/88; H01L 27/15; H01L 33/04; H01L 33/26; H01L 33/502; H01L 33/504; H01L 2924/12041; G03F 7/0007
  USPC ........................................ 430/7; 349/71, 106
  See application file for complete search history.

(56) References Cited

U.S. PATENT DOCUMENTS

| | | | |
|---|---|---|---|
| 9,005,486 B2 | 4/2015 | Brinkman et al. | |
| 9,082,992 B2 | 7/2015 | Guo et al. | |
| 2012/0113672 A1† | 5/2012 | Dubrow | |
| 2018/0298278 A1* | 10/2018 | Zhong | B82Y 20/00 |
| 2019/0018287 A1* | 1/2019 | Luchinger | G02F 1/133514 |

OTHER PUBLICATIONS

Javier Navas et al., "New insights into organic-inorganic hybrid perovskite CH3NH3PbI3 nanoparticles. An experimental and theoretical study of doping Pb2+ sites with Sn2+, Sr2+, Cd2+ and Ca2+", pp. 14, Publication date: Feb. 26, 2015, Publisher: Royal Society of Chemistry, Journal: Nanoscale, vol. 7, pp. 6216-6299.†
Loredana Protesescu et al., "Nanocrystal of Cesium Lead Halide Perovskites (CsPbX3,X=Cl, Br, and I): Novel Optoelectronic Materials Showing Bright Emission with Wide Color Gamut", pp. 5, Publication date: Jan. 29, 2015, Publisher: ACS Publications, Journal: Nano Letters, vol. 15, pp. 3692-3696.†

\* cited by examiner
† cited by third party

Repeating the Patterning Process three times

QUANTUM DOTS, PRODUCTION METHODS THEREOF, AND ELECTRONIC DEVICES INCLUDING THE SAME

CROSS-REFERENCE TO RELATED APPLICATION

This application claims priority to and the benefit of Korean Patent Application No. 10-2015-0189007, filed in the Korean Intellectual Property Office on Dec. 29, 2015, and all the benefits accruing therefrom under 35 U.S.C. § 119, the entire content of which is incorporated herein by reference.

BACKGROUND

1. Field

Electronic devices including a quantum dot are disclosed.

2. Description of the Related Art

Nanoparticles have many intrinsic physical characteristics (e.g., energy bandgaps and melting points) that may be controlled by changing their particle size. For example, a semiconductor nanocrystal, also known as a quantum dot, is a type of a semiconductor material having a crystalline structure with a size of several nanometers. The quantum dot has such a small size that they may have a large surface area per unit volume, thereby showing a quantum confinement effect. The quantum dot has different physicochemical characteristics from those of a bulk material. For example, the quantum dot may absorb light from an excitation source to reach an excited state and subsequently emit energy (e.g., light) corresponding to its energy bandgap.

In the quantum dot, the energy bandgap may be adjusted by controlling the size and/or the composition of the nanocrystal and thereby it may emit light of various wavelengths.

The quantum dot may have a theoretical quantum yield (QY) of about 100% and may emit light of high color purity (e.g., light having a full width half maximum of about 40 nanometers (nm)). The quantum dot may realize enhanced luminous efficiency and improved color reproducibility. Therefore, research has been conducted with regard the use of the quantum dot in different electronic devices such as a display device (e.g., an LCD), a lighting installation, and the like. Despite this research, there remains a need for electronic devices including quantum dots having improved properties.

SUMMARY

An embodiment provides an electronic device (e.g., a backlight unit, a liquid crystal display device, and the like) having enhanced luminous properties (e.g., color reproducibility).

In an embodiment, an electronic device includes a light source having a peak emission at a wavelength between about 440 nanometers (nm) to about 480 nm; and a photo-conversion layer disposed on the light source, wherein the photoconversion layer includes a first quantum dot which emits red light and a second quantum dot which emits green light, wherein at least one of the first quantum dot and the second quantum dot has a perovskite quantum dot having a perovskite crystal structure and the perovskite quantum dot includes a compound represented by Chemical Formula 1:

   Chemical Formula 1

$AB'X_{3+\alpha}$ wherein A is a Group IA metal selected from Rb, Cs, Fr, and a combination thereof, $NR_4^+$, wherein each R is independently a hydrogen atom or a substituted or unsubstituted C1 to C10 straight chain or branched chain alkyl group, $[CH(NH_2)_2]^+$, or a combination thereof; B' is a Group IVA metal selected from Si, Ge, Sn, Pb, and a combination thereof; X is a halogen selected from F, Cl, Br, I, and a combination thereof, $BF_4^-$, or a combination thereof, and α is 0 to 3.

A peak emission wavelength of the red light may be between about 620 nm and about 650 nm and a peak emission wavelength of the green light may be between about 500 nm and about 550 nm.

At least one of the first quantum dot and the second quantum dot may be a non-perovskite quantum dot not having a perovskite crystal structure and the non-perovskite quantum dot may include a Group II-VI compound, a Group III-V compound, a Group IV-VI compound, a Group IV element, a Group IV compound, a Group compound, a Group I-II-IV-VI compound, or a combination thereof.

The perovskite quantum dot may further include at least one of a first dopant and a second dopant, wherein the first dopant may include potassium (K) or a first metal having a crystal ionic radius of less than about 133 picometers (pm) and being different from the Group IVA metal and the Group IA metal and, if present, and the second dopant may include a non-metal element which forms a bond with the Group IVA metal.

The first metal may have a crystal ionic radius that is smaller than a crystal ionic radius of the Group IVA metal in the compound of Chemical Formula 1.

The first metal may include Zn, Cd, Hg, Ga, In, Tl, Cu, Al, Li, Na, Be, Mg, Ca, Sr, Ag, Pt, Pd, Ni, Co, Fe, Cr, Zr, Mn, Ti, Ce, Gd, or a combination thereof.

In an embodiment, the non-metal element includes S, Se, Te, or a combination thereof.

The perovskite quantum dot may include the first dopant, and an amount of the first dopant may be greater than or equal to about 0.001 parts per million (ppm) as measured by inductively coupled plasma-atomic emission spectroscopy (ICP-AES).

The perovskite quantum dot may include the second dopant, and an amount of the second dopant may be greater than or equal to about 0.001 ppm as measured by inductively coupled plasma-atomic emission spectroscopy (ICP-AES).

The perovskite quantum dot may include the first dopant and the second dopant and each of an amount of the first dopant and an amount of the second dopant may be greater than or equal to about 0.001 ppm as measured by inductively coupled plasma-atomic emission spectroscopy (ICP-AES).

The compound represented by Chemical Formula 1 may include $CsPbCl_{3+\alpha}$, $CsPbBr_{3+\alpha}$, $CsPbI_{3+\alpha}$, $CsPb(Cl,I)_{3+\alpha}$, $CsPb(Br,I)_{3+\alpha}$, $CsPb(Br,Cl)_{3+\alpha}$, or a combination thereof.

In the perovskite quantum dot, an atomic ratio of a halogen to the Group IA metal may be greater than or equal to about 3.0 as measured by transmission electron microscope-energy dispersive X-ray spectroscopy (TEM-EDX).

In the perovskite quantum dot, an atomic ratio of a halogen to the Group IA metal may be greater than or equal to about 3.1 as measured by transmission electron microscope-energy dispersive X-ray spectroscopy (TEM-EDX).

At least one of the first quantum dot and the second quantum dot may independently include an organic ligand compound on a surface thereof, wherein the organic ligand compound is at least one selected from RCOOH, $RNH_2$, $R_2NH$, $R_3N$, RSH, $R_3PO$, $R_3P$, ROH, RCOOR', $RPO(OH)_2$, $R_2POOH$, RCOOCOR' (wherein, R and R' are independently a substituted or unsubstituted C1 to C24 aliphatic hydrocarbon group or a substituted or unsubstituted C5 to C24 aromatic hydrocarbon group), and a combination thereof.

The photoconversion layer may include a polymer matrix and the first quantum dot and the second quantum dot may be dispersed in the polymer matrix.

The polymer matrix may include a thiolene polymer, a (meth)acrylate-based polymer, a urethane-based polymer, an epoxy polymer, a vinyl-based polymer, a silicone polymer, or a combination thereof.

The electronic device is configured to emit light which may have a color gamut ratio of at least about 80% with respect to BT2020 in a CIE1931 color space.

The electronic device is configured to emit light which may have a color gamut ratio of at least about 87% with respect to BT2020 in a CIE1931 color space.

The electronic device is configured to emit light which may have a color gamut ratio of at least about 88% with respect to BT2020 in a CIE1931 color space.

The device is configured such that green light emitted from the photoconversion layer has a color coordinate Cy value of greater than or equal to about 0.73.

The electronic device may further include a liquid crystal panel, and the liquid crystal panel may include a lower substrate, an upper substrate, and a liquid crystal layer interposed between the upper and lower substrates.

The liquid crystal panel may include an absorption color filter, the photoconversion layer is configured to emit white light, and the liquid crystal panel may be disposed on the photoconversion layer so that the white light passes through the liquid crystal panel.

In some embodiments, the absorption color filter may have a first color section configured for passing red light, a second color section configured for passing green light, and a third color section configured for passing blue light, wherein a light emitted from the photoconversion layer and passing through the second color section has a spectrum which may not include an emission peak having a normalized intensity of greater than or equal to about 0.1 at a wavelength of less than about 500 nm, and wherein a light emitted from the photoconversion layer and passing through the third section has a spectrum which may not include an emission peak having an a normalized intensity of greater than or equal to about 0.15 at a wavelength of greater than about 500 nm.

In some embodiments, the liquid crystal panel does not include an absorption color filter, and the photoconversion layer may be disposed on a top surface or a bottom surface of the upper substrate of the liquid crystal panel.

The photoconversion layer may have a pattern including a first color section configured to emit red light, a second color section configured to emit green light, and a third color section configured to pass or emit blue light.

The red light may have a maximum peak emission wavelength of about 620 nm to about 650 nm and the green light may have a maximum peak emission wavelength of about 530 nm to about 550 nm The first color section may include the first quantum dot and the second color section may include the second quantum dot The electronic device of the aforementioned embodiments may have an increased color reproduction range and thus may have a higher color gamut ratio with respect to a BT2020 standard in a CIE 1931 color space.

In some embodiments, an electronic device includes:
a light source having a peak emission at a wavelength of about 440 nm to about 480 nm; and
a photoconversion layer disposed on the light source,
wherein the photoconversion layer comprises a first quantum dot and a second quantum dot different from the first quantum dot, and the first quantum dot and the second quantum dot are configured to convert the wavelength of light emitted from the light source into light having a wavelength which is different from the wavelength of light emitted from the light source, and
wherein the device is configured to emit light having a color gamut ratio of at least about 80% with respect to BT2020 in a CIE1931 color space.

In the electronic device, at least one of the first quantum dot and the second quantum dot may have a perovskite crystal structure and includes a compound represented by Chemical Formula 1:

$$AB'X_{3+\alpha} \qquad \text{Chemical Formula 1}$$

wherein A is a Group IA metal selected from Rb, Cs, Fr, and a combination thereof, $NR_4^+$, wherein each R is independently a hydrogen atom or a substituted or unsubstituted C1 to C10 straight chain or branched chain alkyl group, $[CH(NH_2)_2]^+$, or a combination thereof; B' is a Group IVA metal selected from Si, Ge, Sn, Pb, and a combination thereof; X is a halogen selected from F, Cl, Br, I, and a combination thereof, $BF_4^-$, or a combination thereof, and $\alpha$ is 0 to 3.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
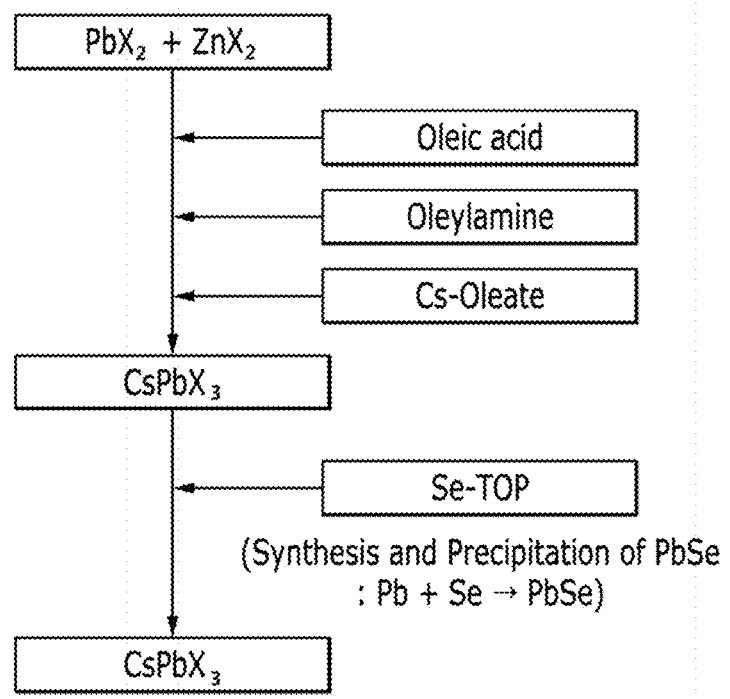
FIG. 1 is a flowchart of a method of manufacturing a perovskite quantum dot, according to an embodiment.

Advantages and characteristics of this disclosure, and a method for achieving the same, will become evident referring to the following example embodiments together with the drawings attached hereto. The embodiments may, however, be embodied in many different forms and should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. In addition, unless explicitly described to the contrary, the word "comprise" and variations such as "comprises" or "comprising," will be understood to imply the inclusion of stated elements but not the exclusion of any other elements.

Further, the singular includes the plural, unless mentioned otherwise.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "doping" refers to the inclusion of a dopant in a crystal structure of a quantum dot. In an exemplary embodiment, inclusion of a dopant in the crystal structure does not substantially change the crystal structure and/or may be occur through the formation of a bond (e.g. a chemical or physical bond) between the dopant and a component of the quantum dot. For example, a dopant atom (e.g., a metal such as Zn or a chalcogen element) may be substituted for an atom in a crystal structure, or may be present in the interstices of a crystal lattice. In some embodiments, the dopant element may form a bond with an element constituting the crystal lattice to form a chemical species attached to a surface thereof.

In some embodiments, when the dopant is present in the lattice or as an alloy, an X-ray diffraction spectrum of the quantum dot including the dopant may show a crystalline peak that is shifted to a different diffraction angle relative to an X-ray diffraction spectrum of the quantum dot without the dopant (i.e., an "undoped" quantum dot). In other embodiments (e.g., the amount of the dopant is very small), the X-ray diffraction spectrum of a quantum dot including the dopant is substantially the same as the X-ray diffraction spectrum of an undoped quantum dot. When the dopant is present as a crystal outside of the lattice of the quantum dot, its inherent peak may be detected in an X-ray diffraction spectrum of the doped quantum dot. In an embodiment, the presence of the dopant may be confirmed, for example, by X-ray photoelectron spectroscopy, energy dispersive X ray spectroscopy, inductively coupled plasma-atomic emission spectroscopy (ICP-AES), or a combination thereof.

As used herein, the terms "quantum yield" (QY) or the term "quantum efficiency (QE), are used to refer to a value determined from a photoluminescence spectrum, which is obtained by dispersing quantum dots in an organic solvent (e.g. toluene) and calculating relative photoluminescence with respect to the photoluminescent peak of an organic solution of a reference dye (e.g., an ethanol solution of coumarin dye, which has an absorption (optical density) at 458 nm of 0.1). As used herein, the term "quantum yield (QY)" and the term "quantum efficiency (QE)" have substantially the same meaning and can be used interchangeably.

As used herein, the term "metal" refers to a metallic element such as an alkali metal, an alkaline earth metal, a transition metal, and a basic metal. The term "metal" also includes a semi-metallic element such as Si and the like.

As used herein the term "color gamut ratio" refers to an area consistency ratio of a color gamut of a given device to a standard color gamut. The area consistency ratio is a ratio (S2/S1) of the area (S1) of the standard color gamut (e.g., a triangle area) to the area (S2) of the color gamut of the given device that overlaps the standard color gamut.

Further, the singular includes the plural, unless mentioned otherwise.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As the quantum dot has a nano-size, the luminous properties and stability of the quantum dot may be easily affected by the external environment. In addition, the dispersablity of the quantum dot tends to be insufficient in various mediums. Therefore, despite its unique properties, the application of the quantum dot in devices in which luminous properties and reliability are desired features, may be difficult.

In an embodiment, an electronic device includes a light source having a peak emission (e.g., a maximum peak emission) at a wavelength of about 440 nm to about 480 nm; and a photoconversion layer disposed on the light source. The photoconversion layer includes a first quantum dot which emits a red light and a second quantum dot which emits a green light. A peak emission (e.g., a maximum peak emission) of the red light may be at a wavelength of about 620 nm to about 650 nm, for example, about 640 nm to about 650 nm. A peak emission (e.g., a maximum peak emission) of the red light may be at a wavelength of about 500 nm to about 550 nm, for example, about 510 nm to about 530 nm. At least one of the first and second quantum dots includes a perovskite quantum dot having a perovskite crystal structure. In some embodiments, at least one of the first and second quantum dots may be a non-perovskite quantum dot that does not have the perovskite crystal structure. For example, the first quantum dot may include a non-perovskite quantum dot and the second quantum dot may include a perovskite structure. Hereinafter will be explained some embodiments wherein the first quantum dot is a non-perovskite quantum dot and the second quantum dot is a perovskite structure. However, it is not limited thereto.

The first quantum dot may include a Group II-VI compound, a Group III-V compound, a Group IV-VI compound, a Group IV element, a Group IV compound, a Group I-III-VI compound, a Group I-II-IV-VI compound, or a combination thereof. In some embodiments, the first quantum dot does not include cadmium.

For example, the Group II-VI compound may be selected from:

a binary element compound selected from CdSe, CdTe, ZnS, ZnSe, ZnTe, ZnO, HgS, HgSe, HgTe, MgSe, MgS, and a combination thereof;

a ternary element compound selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The Group II-VI compound may further include a Group III metal.

The Group III-V compound may be selected from:

a binary element compound selected from GaN, GaP, GaAs, GaSb, AlN, AlP, AlAs, AlSb, InN, InP, InAs, InSb, and a combination thereof;

a ternary element compound selected from GaNP, GaNAs, GaNSb, GaPAs, GaPSb, AlNP, AlNAs, AlNSb, AlPAs, AlPSb, InNP, InNAs, InNSb, InPAs, InPSb, and a combination thereof; and a quaternary element compound selected from GaAlNP, GaAlNAs, GaAlNSb, GaAlPAs, GaAlPSb, GaInNP, GaIn-NAs, GaInNSb, GaInPAs, GaInPSb, InAlNP, InAlNAs, InAlNSb, InAlPAs, InAlPSb, and a combination thereof.

The Group III-V compound may further include a Group II metal (e.g., InZnP).

The Group IV-VI compound may be selected from:

a binary element compound selected from SnS, SnSe, SnTe, PbS, PbSe, PbTe, and a combination thereof;

a ternary element compound selected from SnSeS, SnSeTe, SnSTe, PbSeS, PbSeTe, PbSTe, SnPbS, SnPbSe, SnPbTe, and a combination thereof; and a quaternary element compound selected from SnPbSSe, SnPbSeTe, SnPbSTe, and a combination thereof.

Examples of the Group compound may include $CuInSe_2$, $CuInS_2$, CuInGaSe, and CuInGaS, but are not limited thereto.

Examples of the Group I-II-IV-VI compound may include CuZnSnSe and CuZnSnS, but are not limited thereto.

The Group IV element may include:

a single-element selected from Si, Ge, and a combination thereof; and

The Group IV compound may include:

a binary element compound selected from SiC, SiGe, and a combination thereof.

The binary element compound, the ternary element compound, or the quaternary element compound may respectively be included in a uniform concentration in the quantum dot particle or may be included in partially different concentrations in the same quantum dot particle.

The first quantum dot may have a core-shell structure wherein a first semiconductor nanocrystal (a core) is surrounded by a crystalline or amorphous material (e.g. a second semiconductor nanocrystal) that is different from the first semiconductor nanocrystal. The interface between the core and the shell may have a concentration gradient wherein the concentration of an element in the shell radially changes from an outer surface of the shell towards the inner surface of the shell (e.g., the concentration decreases towards the core). In addition, the core shell type quantum dot may have a semiconductor nanocrystal core and a multi-layered shell surrounding the semiconductor nanocrystal core. The core and multi-layered shell structure has at least two layers of the shell wherein each layer may be a single composition, an alloy, or the one having a concentration gradient.

In the core-shell type quantum dot, a material of the shell (e.g. the second semiconductor nanocrystal) may have a larger energy band-gap than the material of the core (e.g. the first semiconductor nanocrystal) for more effectively exhibiting a quantum confinement effect. In case of the core-shell quantum dot having a multi-layered shell, a band-gap energy of the material of an outer layer of the shell may be greater than the band-gap energy of the material of an inner layer of the shell (a layer that is closer to the core).

The first quantum dot may have a quantum yield of greater than or equal to about 10 percent (%), or greater than or equal to about 30%, for example, greater than or equal to about 50%, greater than or equal to about 60%, greater than or equal to about 70%, or greater than or equal to about 90%. The first quantum dot may have a full width at half max (FWHM) of less than or equal to about 45 nm, for example less than or equal to about 40 nm, or less than or equal to about 30 nm.

The first quantum dot may have a particle size (e.g., a diameter or a longest length) of about 1 nm to about 100 nm. For example, the first quantum dot may have a particle diameter of about 1 nm to about 20 nm, for example, from 2 nm to 15 nm, or from about 3 nm to about 15 nm.

The shape of the first quantum dot is not particularly limited. For example, the quantum dot may include a nanosized particle or a nanosheet. The first quantum dot may have a spherical shape, elliptical shape, pyramidal shape, polygonal shape, multi-armed shape, or a cubic shape.

The first quantum dot is commercially available or may be synthesized by any method known in the art. For example, several nano-sized quantum dots may be synthesized according to a wet chemical process. In the wet chemical process, precursors react in an organic solvent to grow nanocrystal particles, and the organic solvent or a ligand compound may coordinate to the surface of the nanocrystal particle, thereby controlling a growth thereof.

The perovskite quantum dot (e.g., the second quantum dot) has a perovskite crystal structure and includes a compound represented by Chemical Formula 1:

$$AB'X_{3+\alpha} \quad \text{Chemical Formula 1}$$

wherein A is a Group IA metal selected from Rb, Cs, Fr, and a combination thereof, $NR_4^+$, wherein each R is independently a hydrogen atom or a substituted or unsubstituted C1 to C10 straight chain or branched chain alkyl group, $[CH(NH_2)_2]^+$, or a combination thereof; B' is a Group IVA metal selected from Si, Ge, Sn, Pb, and a combination thereof; X is at least one halogen selected from F, Cl, Br, and I, $BF_4^-$, or a combination thereof, and α is greater than or equal to 0, for example, greater than 0, greater than or equal to about 0.1, or greater than or equal to about 0.2, and less than or equal to about 3 for example, less than or equal to about 2.5, less than or equal to about 2, less than or equal to about 1.5, less than or equal to about 1, less than or equal to about 0.9, less than or equal to about 0.8, less than or equal to about 0.7, less than or equal to about 0.6, less than or equal to about 0.5, less than or equal to about 0.4, or less than or equal to about 0.3. In an embodiment, a surface of the quantum dot includes a halogen. For example, $NR_4^+$ may be $[CH_3NH_3]^+$, $NH_4^+$, $[C_2H_5NH_3]^+$, or a combination thereof.

The compound represented by Chemical Formula 1 may include $CsPbCl_{3+\alpha}$, $CsPbBr_{3+\alpha}$, $CsPbI_{3+\alpha}$, $CsPb(Cl,I)_{3+\alpha}$, $CsPb(Br,I)_{3+\alpha}$, $CsPb(Br,Cl)_{3+\alpha}$, or a combination thereof. As used herein, the expression (X1, X2) (wherein X1 and X2 are each independently a halogen different from each other, such as (Cl,I), (Br,I), and (Br,I), refers to a compound that includes two different halogens (e.g., Cl and I, Br and I, or Br and Cl). When the compound includes two halogens, the mole ratio therebetween is not particularly limited. For example, when the compound includes two halogens, X1 and X2, the amount of the X2 per one mole of X1 is greater than or equal to about 0.01 moles, for example, 0.1 moles, greater than or equal to about 0.2 moles, greater than or equal to about 0.3 moles, greater than or equal to about 0.4 moles, or greater than or equal to about 0.5 moles. In an embodiment, when the compound includes two halogens, X1 and X2, the amount of the X2 per one mole of X1 is less than or equal to about 100 moles, less than or equal to about 10 moles, less than or equal to about 9 moles, less than or equal to about 8 moles, less than or equal to about 7 moles, less than or equal to about 6 moles, less than or equal to about 5 moles, less than or equal to about 4 moles, less than or equal to about 4 moles, less than or equal to about 3 moles, less than or equal to about 2 moles, or less than or equal to about 1 mole. For example, when the compound includes two halogens, X1 and X2, the amount of the X2 per one mole of X1 is about 0.1 moles to about 10 moles, about 0.2 moles to about 5 moles, or about 0.3 moles to about 3 moles, but it is not limited thereto.

The perovskite crystal structure may have a cubic crystalline lattice and the presence thereof can be confirmed by X-ray diffraction spectroscopy. In the embodiments, the second quantum dot may have a cubic shape and/or a rectangular parallelepiped shape, but it is not limited thereto. The second quantum dot may have a core-shell structure. Details of the core-shell structure are the same as set forth above.

In the second quantum dot, an atomic ratio of a halogen element to the Group IA element as measured by transmission electron microscope-energy dispersive X-ray spectroscopy (TEM-EDX) may be greater than or equal to about 3.0, for example, greater than or equal to about 3.1. The second quantum dot may include a greater amount of halogen than a stoichiometric amount for the formation of the perovskite crystal and/or a surface of the quantum dot may have a halogen rich surface.

The perovskite quantum dot may further include at least one of a first dopant and a second dopant. The second dopant may include a non-metal element that forms a bond with the Group IVA metal. The first dopant may include potassium (K) or a first metal having a crystal ionic radius of less than about 133 picometers (pm) and being different from the Group IVA metal and, if present, the Group IA metal. For example, the first metal may have a crystal ionic radius of about 67 pm to about 120 pm. The first metal may have a crystal ionic radius that is less than the crystal ionic radius of the Group IVA metal of the component B in Chemical Formula 1. For example, when B is Pb, the crystal ionic radius of the first metal is less than 133 pm. The crystal ionic radius may correspond to the physical size of the ion in a solid, and in this regard, the publication of the revised ionic radius by Shannon may be referred to (e.g., R. D. Shannon (1976) "Revised effective ionic radii and systematic studies of interatomic distances in halides and chalcogenides". Acta Cryst A32, pp. 751-767, the content of which is incorporated herein by reference in its entirety).

The first dopant may substitute for the metal element (e.g., the Group IA metal such as Cs and Rb, and/or the Group IVA metal such as Pb) in the compound represented by Chemical Formula 1. In an embodiment, the first dopant may include the first metal having a crystal ionic radius that is less than crystal ionic radius of the Group IVA element. In an embodiment, the first dopant may include a metal ion (e.g., a monovalent ion or a divalent ion) having the same valence as that of the Group IVA metal or a Group IA metal. In an embodiment, the first dopant may include a metal capable of forming a compound (e.g., a metal oxide) having a lattice structure that is substantially similar to that of the perovskite lattice structure. The second dopant may include an element that may form a chemical bond with the Group IVA metal (e.g., Pb) during the synthesis of a quantum dot including the aforementioned compound, and thereby may be precipitated out of solution. Without wishing to be bound by theory, it is believed that this may contribute to decreasing the amount of the Group IVA metal in a reaction system during the synthesis. As a result, the resulting quantum dot may include an excess amount of the halogen, or a surface of the quantum dot may include a halogen.

In some embodiments, the first metal may be selected from Zn, Cd, Hg, Ga, In, Tl, Cu, Al, Li, Na, Be, Mg, Ca, Sr, Ag, Pt, Pd, Ni, Co, Fe, Cr, Zr, Mn, Ti, Ce, Gd, and a combination thereof. In some embodiments, the non-metal element may be selected from S, Se, Te, and a combination thereof.

The presence of the first and second dopants may be confirmed by inductively coupled plasma-atomic emission spectroscopy (ICP-AES). For example, in the quantum dot, the amount of the first dopant may be greater than or equal to about 0.001 ppm, for example, greater than or equal to about 0.04 ppm, as measured by ICP-AES. In the quantum dot, the amount of the second dopant may be greater than or equal to about 0.001 ppm, for example, about 0.04 ppm as measured by ICP-AES.

The first and second quantum dots may be a colloidal quantum dot prepared using a wet chemical method, and thus a surface thereof may have an organic ligand compound. The organic ligand compound may be selected from $RCOOH$, $RNH_2$, $R_2NH$, $R_3N$, $RSH$, $R_3PO$, $R_3P$, $ROH$, $RCOOR'$, $RPO(OH)_2$, $R_2POOH$, $RCOOCOR'$, and a combination thereof, wherein, each R and R' are independently a substituted or unsubstituted C1 to C24 aliphatic hydrocarbon group such as an alkyl group, an alkenyl group, or an alkynyl group, or a substituted or unsubstituted C5 to C24 aromatic hydrocarbon group, such as an aryl group.

Specific examples of the organic ligand compound may include methane thiol, ethane thiol, propane thiol, butane thiol, pentane thiol, hexane thiol, octane thiol, dodecane thiol, hexadecane thiol, octadecane thiol, benzyl thiol; methane amine, ethane amine, propane amine, butane amine, pentane amine, hexane amine, octane amine, dodecane amine, hexadecyl amine, octadecyl amine, dimethyl amine, diethyl amine, dipropyl amine, oleylamine, methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, benzoic acid, palmitic acid, stearic acid; a phosphine such as methyl phosphine, ethyl phosphine, propyl phosphine, butyl phosphine, pentyl phosphine, tributylphosphine, or trioctylphosphine; a phosphine compound or an oxide compound thereof such as methyl phosphine oxide, ethyl phosphine oxide, propyl phosphine oxide, butyl phosphine oxide, or trioctylphosphine oxide; diphenyl phosphine, triphenyl phosphine or an oxide compound thereof; phosphonic acid, and the like, but are not limited thereto. The organic ligand compound may be used alone or as a mixture of greater than two organic ligands.

In some embodiments, the quantum dot does not include an amine organic ligand having an alkyl group of at least 6 carbon atoms, such as at least 8 carbon atoms (e.g., n-octyl amine).

A colloidal halide perovskite quantum dot may be an example of a suitable quantum dot material due to its photoluminescence properties such as color tunability, desirable bandgap, and the like. For example, a $CsPbX_3$ nanoparticle and a $CH_3NHPbX_3$ nanoparticle are examples of a fully or partially inorganic perovskite nanoparticle.

The inventors have found that the halide perovskite quantum dot of, for instance, a $CsPbX_3$ nanoparticle or a $CH_3NHPbX_3$ nanoparticle, does not have desirable stability. For example, the halide perovskite quantum dot may exhibit an undesirable quantum yield when separated from a synthesis solvent and/or washed to remove the solvent, or after dispersion in a dispersion solvent (e.g., toluene). In addition, the dispersability of the halide perovskite quantum dot may decrease over time. For example, when the halide perovskite quantum dot is separated from the synthesis solvent thereof, dispersed in a dispersion solvent such as toluene, and then allowed to stand in the air, it loses its photoluminescence within one week, and is precipitated.

Without wishing to be bound by any theory, it is believed that when the halide perovskite quantum dot is separated from the synthesis solvent and washed, the quantum dot may lose an amount of an organic ligand previously bound to a surface thereof, and due to the loss of the ligand, the metal elements may be exposed on a surface thereof. The exposed metal elements may be susceptible to factors in the external environment such as oxygen, moisture, or heat, and as a result, the metal elements may be transformed into an oxide or a decomposition product. However, rather than being used directly after the synthesis, the quantum dots may be washed with a non-solvent for the removal of impurities, and then re-dispersed in a solvent optimized for an applied field. In addition, the quantum dots may go through a surface exchange or may be prepared into a quantum dot-polymer composite. The aforementioned changes on a surface of the quantum dot (i.e., loss of the ligand and exposure of a metal atom) which occur after the washing with the non-solvent, and the subsequent deterioration in stability caused thereby, may hinder the subsequent application of the quantum dot.

In some embodiments, the perovskite quantum dot may include a first dopant such as Zn and/or a second dopant such as Se and/or may include a halogen in an amount greater than the amount necessary for the formation of the perovskite structure. Accordingly, the second quantum dot may avoid a substantial decrease in quantum efficiency (or quantum yield) when removed from a synthesis solvent, washed, and then dispersed again in a dispersion solvent. For example, after being separated from the synthesis solvent, the second quantum dot may have a quantum efficiency of greater than or equal to about 60%, for example, greater than or equal to about 70%, greater than or equal to about 75%, or greater than or equal to about 80%, relative to its original quantum efficiency. In addition, the second quantum dots may be stable with respect to an external environment such as oxygen, moisture, and the like when they are dispersed in a dispersion solvent (e.g., toluene). For example, the quantum dot of an embodiment may maintain initial quantum efficiency after being in air for about 24 hours or longer, or about 48 hours or longer. In addition, the second quantum dot may include a surface ligand in at least an amount necessary for maintaining its stability, even after they are separated from the synthesis solvent and washed. Therefore, the second quantum dot may be re-dispersed in various different types of dispersion solvents even after being kept in the air.

Without wishing to be bound by any theory, it is believed that the second quantum dot having a perovskite structure may include an excess amount of a halogen, optionally together with a first dopant and/or a second dopant, on a surface thereof and thereby its entire composition and/or surface composition may change to keep the ligand loss at a minimum level (e.g., suppress ligand loss) upon the washing with the non-solvent. In addition, an individual or combined effect of the halogen element, the first/second dopant(s), and the ligand on a surface thereof may suppress oxidation of the metal constituting the perovskite structure, thereby preventing damage to the perovskite structure.

The second quantum dot may have a size of about 1 nm to about 50 nm, for example, about 2 nm to about 15 nm, or about 3 nm to about 14 nm. The size of the quantum dot may be measured using any suitable method. For example, the size of the quantum dot may be directly measured from a transmission electron microscopic (TEM) image or may be calculated from the full width at half maximum (FWHM) of the peak of the XRD spectrum using the Scherrer equation. The second quantum dot may have a FWHM of a photoluminescence peak wavelength of less than or equal to about 30 nm, for example, less than or equal to about 29 nm, less than or equal to about 28 nm, less than or equal to about 27 nm, less than or equal to about 26 nm, or less than or equal to about 25 nm. The quantum dot may have quantum efficiency (QE) or quantum yield (QY) of greater than or equal to about 60%, for example, greater than or equal to about 62%, greater than or equal to about 63%, greater than or equal to about 64%, greater than or equal to about 65%, greater than or equal to about 66%, or greater than or equal to about 67%. The second quantum dot of an embodiment, for example, does not include cadmium, but may show desirable photoluminescence characteristics (e.g., a high quantum efficiency, a narrow FWHM, desirable color purity, and the like).

The second quantum dot of some embodiments may be prepared by a method that includes:

preparing a reaction solution including a first precursor including a Group IA metal selected from Rb, Cs, Fr, and a combination thereof, $NR_4^+$ (wherein each R independently is a hydrogen atom or a substituted or unsubstituted C1 to C10 straight chain or branched chain alkyl group), [CH$(NH_2)_2$]$^+$, BF4, or a combination thereof; a second precursor including a halogen and a Group IVA metal selected from Ge, Si, Sn, Pb, and a combination thereof; and at least one of a first additive and a second additive, wherein the first additive includes a halogen and a first metal, the first metal having a crystal ionic radius of less than or equal to about 133 pm and being different from the Group IVA metal and, if present, the Group IA metal, and the second additive includes a non-metal element that may form a bond with the Group IVA metal; and carrying out a reaction between the first precursor and the second precursor in the reaction solution to synthesize a quantum dot that has a perovskite crystal structure, includes a compound represented by Chemical Formula 1, and has a size of about 1 nm to about 50 nm The halogen may include F, Cl, Br, I, or a combination thereof.

The preparing of the reaction solution may include solvating the first precursor, the second precursor, the first additive, the second additive, or combination thereof in a solvent selected from a C6 to C22 amine compound, a nitrogen-containing heterocyclic compound, a C6 to C40 aliphatic hydrocarbon, a C6 to C30 aromatic hydrocarbon, a C6 to C22 phosphine oxide compound, a C12 to C22 aromatic ether, and a combination thereof.

The reaction solution may further include at least one organic ligand compound selected from RCOOH, $RNH_2$, $R_2NH$, $R_3N$, RSH, $R_3PO$, $R_3P$, ROH, RCOOR', RPO(OH)$_2$, $R_2POOH$, RCOOCOR', and a combination thereof, wherein, each R and R' are independently a substituted or unsubstituted C1 to C24 aliphatic hydrocarbon group or a substituted or unsubstituted C5 to C24 aromatic hydrocarbon group.

Figure 2:
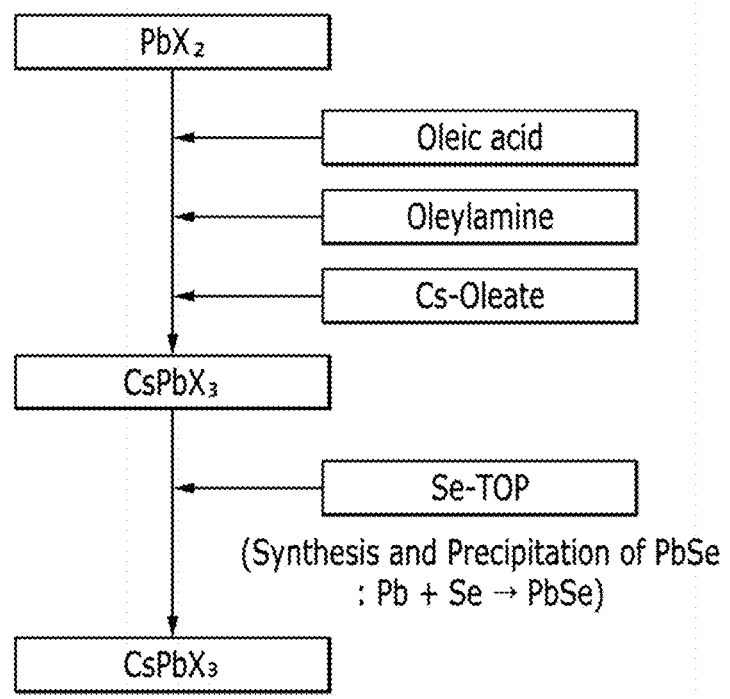
FIG. 2 is a flowchart of a method of manufacturing a perovskite quantum dot, according to another embodiment.
Figure 3:
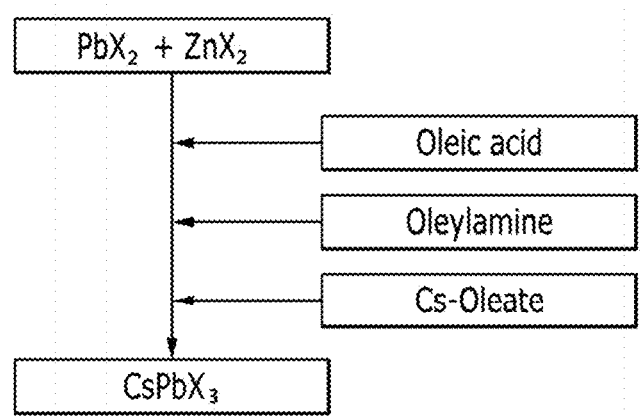
FIG. 3 is a flowchart of a method of manufacturing a perovskite quantum dot, according to yet another embodiment.

Referring to FIGS. 1 to 3 illustrating non-limiting examples, the preparation of a reaction solution is illustrated in more detail.

Referring to FIG. 1, the second precursor (e.g., PbX$_2$) and the first additive (e.g., ZnX$_2$) are mixed in a solvent, and the organic ligand (e.g., oleylamine and oleic acid) is injected thereinto to prepare a solution of the second precursor and the first additive.

Aside from the preparation of the aforementioned solution, a compound including a Group IA metal (e.g., $Cs_2CO_3$) or a quaternary ammonium salt (e.g., a $[CH(NH_2)_2]^+$ salt or a $NR_4^+$ salt such as $CH_3NH_3Br$ or $CH_3NH_3BF_4$) is dissolved in a solvent and optionally a compound (e.g., oleic acid) for forming the first precursor, and the solution is optionally heated to prepare a first precursor solution including the first precursor (e.g., Cs oleate, that is, Group IA metal-carboxylate or quaternary ammonium salt such as $CH_3NH_3Br$).

The first precursor solution is added to a solution including the second precursor and the first additive to obtain a reaction solution, and a reaction between the first and the second precursors is carried out in the reaction solution. The reaction may be carried out at a predetermined temperature (e.g., at greater than or equal to about 50° C. (e.g., a temperature of about 100° C. to about 240° C.). If desired, the second additive (e.g., selenium-triphenylphosphine (Se-TOP)) may be added to the reaction solution before the initiation of the reaction or after the progress of the reaction, and before the completion of the reaction.

Referring to FIG. 2, the second precursor (e.g., $PbX_2$) may be mixed with (or dissolved in) a solvent, and the organic ligand (e.g., oleylamine and oleic acid) is injected thereto and the second precursor is solubilized to prepare a second precursor-containing solution.

A first precursor solution including the first precursor (e.g., Cs oleate, that is, a Group IA metal-carboxylate) may be prepared by dissolving a compound including a Group IA metal (e.g., $Cs_2CO_3$) in a solvent and optionally a compound for forming the first precursor (e.g., oleic acid), and optionally heating the solution.

The first precursor solution is added to the second precursor-containing solution to obtain a reaction solution, and a reaction between the first and the second precursors is carried out, for example, at a temperature of greater than or equal to about 50° C. (e.g., a temperature of about 100° C. to about 240° C.), and the second additive (e.g., Se-TOP) may be added to the reaction solution before the initiation of the reaction or after the progress of the reaction, and before the completion of the reaction. In some embodiments, the first precursor solution may be mixed with the second precursor-containing solution during a process of preparing the second precursor-containing solution or adding materials for the second precursor to the first precursor solution in any order.

Referring to FIG. 3, the second precursor (e.g., $PbX_2$) and the first additive (e.g., $ZnX_2$) are mixed with (dissolved in) a solvent, and the organic ligand (e.g., oleylamine and oleic acid) is injected thereto to dissolve the second precursor and the first additive and thereby a solution including the second precursor and the first additive is prepared. The solution including the first precursor may be prepared in accordance with the aforementioned manner and may be added to the solution including the second precursor and the first additive to provide the reaction solution. As the reaction solution as heated to a reaction temperature (e.g., a temperature of greater than or equal to about 80° C., for example, a temperature of about 100° C. to about 240° C.), a reaction between the first and the second precursors is carried out to synthesize the second quantum dot.

In the method illustrated in FIGS. 1 to 3, the first additive and the second precursor are simultaneously dissolved in a solvent, but the method is not limited thereto. The first additive may be prepared as a separate solution from the second precursor and then be added to the reaction solution at any point prior to or during the synthesis of the compound represented by Chemical Formula 1.

In addition, the second additive may be added to the reaction solution at any time prior to or during the synthesis of the compound represented by Chemical Formula 1.

As described above, in the aforementioned method, the reaction solution may include the first additive, the second additive, or both, before the initiation of the reaction or added during the progress of the reaction. Accordingly, the reaction solution may include a reduced amount of the Group IVA metal (e.g. Pb) and a relatively excessive amount of the halogen.

Without wishing to be bound by any theory, it is believed that in the aforementioned method, the first additive may play a role of providing an additional supply source of the halogen and may contribute to reducing the relative amount of the Group IVA metal in the prepared quantum dot because the metal included therein (e.g., the first metal) may replace the Group IVA metal or may be added separately (e.g., injected as an interstitial element or bound physically on a surface of the quantum dot). In addition, the second additive may form a precipitate together with the Group IVA metal element (e.g., PbSe) during the synthesis of the compound represented by Chemical Formula 1, and thereby may further reduce the relative amount of the Group IVA metal element in the quantum dot. Therefore, the second quantum dot prepared according to the aforementioned method may have a halogen rich surface as confirmed by a TEM-EDX analysis without additional process steps such as a ligand assisted re-precipitation (LARP) process. In addition, the quantum dot prepared according to the aforementioned method may include the first dopant originated from the first additive and the second dopant originated from the second additive.

In the aforementioned method, the first precursor includes the Group IA metal (e.g., Cs or Rb), and may be a metal powder, a metal carbonate, an alkylated metal compound, metal alkoxide, metal carboxylate, metal nitrate, metal perchlorate, metal sulfate, metal acetylacetonate, metal halide, metal cyanide, metal hydroxide, metal oxide, metal peroxide, or a combination thereof. The first precursor may be used alone or as a mixture of two or more first precursors.

In some embodiments, the first precursor may include $NR_4^+$, wherein each R is independently a hydrogen atom or a substituted or unsubstituted C1 to C10 straight or branched alkyl group, such as $CH_3NH_3^+$, $NH_4^+$, $C_2H_5NH_3^+$, $HC(NH_2)_2^+$, or a combination thereof. The first precursor may include $NR_4^+$ and $BF_4$, for example, $NR_4^+BF_4^-$ such as $CH_3NH_3BF_4$.

The first precursor may include the one (e.g., Cs-oleate) obtained by reacting a compound (e.g., $Cs_2CO_3$) including a Group IA metal with a certain compound (e.g., an organic ligand such as oleic acid) in a reaction solvent. The first precursor may be heated to a temperature of greater than or equal to about 80° C., for example, greater than or equal to about 100° C., before the injection in order to minimize precipitation of the first precursor in the reaction solution.

The second precursor may include a Pb halide such as $PbCl_2$, $PbI_2$, or $PbBr_2$, a Ge halide such as $GeCl_2$, $GeCl_4$, $GeI_2$, $GeI_2$, $GeBr_2$, or $GeBr_4$, a Si halide such as $SiCl_2$, $SiCl_4$, $SiI_2$, $SiI_4$, $SiBr_2$, $SiBr_4$, a Sn halide such as $SnCl_2$, $SnI_2$, or $SnBr_2$, or a combination thereof. The second precursor may be used alone or as a mixture of at least two compounds. For the solubilization of the second precursor, the resulting mixture may heated at a predetermined temperature of greater than or equal to about 80° C., for example, greater than or equal to about 120° C., in the presence of an organic ligand, depending on a selected solvent.

The first additive may include a zinc halide such as $ZnCl_2$, $ZnBr_2$, or $ZnI_2$, a Cd halide such as $CdCl_2$, $CdBr_2$, or $CdI_2$, a Hg halide such as $HgCl_2$, $HgBr_2$, or $HgI_2$, a Ga halide such as $GaCl_3$, $GaBr_3$, or $GaI_3$, an In halide such as $InCl_3$, $InBr_3$, or $InI_3$, a Tl halide such as $TlCl$, $TlBr$, or $TlI$, a Cu halide such as $CuCl_2$, $CuBr_2$, or $CuI_2$, a Al halide such as $AlCl_3$, $AlBr_3$, or $AlI_3$, a Li halide such as $LiCl$, $LiBr$, or $LiI$, a Na halide such as $NaCl$, $NaBr$, or $NaI$, a K halide such as $KCl$, $KBr$, or $KI$, a Be halide such as $BeCl_2$, $BeBr_2$, or $BeI_2$, a Mg halide such as $MgCl_2$, $MgBr_2$, or $MgI_2$, a Ca halide such as $CaCl_2$, $CaBr_2$, or $CaI_2$, a Sr halide such as $SrCl_2$, $SrBr_2$, or $SrI_2$, a Ag halide such as $AgCl$, $AgBr$, or $AgI$, a Pt halide such as $PtCl_2$, $PtBr_2$, or $PtI_2$, a Pd halide such as $PdCl_2$, $PdBr_2$, or $PdI_2$, a Ni halide such as $NiCl_2$, $NiBr_2$, or $NiI_2$, a Co halide such as $CoCl_2$, $CoBr_2$, or $CoI_2$, a Fe halide such as $FeCl_2$, $FeBr_2$, or $FeI_2$, a Cr halide such as $CrCl_3$, $CrBr_3$, or $CrI_3$, a Zr halide such as $ZrCl_4$, $ZrBr_4$, or $ZrI_4$, a Mn halide such as $MnCl_2$, $MnBr_2$, or $MnI_2$, a Ti halide such as $TiCl_3$, $TiBr_3$, or $TiI_3$, a Ce halide such as $CeCl_3$, $CeBr_3$, or $CeI_3$, a Gd halide such as $GdCl_3$, $GdBr_3$, or $GdI_3$, or a combination thereof. The first additive may be used alone or as a mixture of two or more compounds.

The second additive may include sulfur-trioctylphosphine (S-TOP), sulfur-tributylphosphine (S-TBP), sulfur-triphenylphosphine (S-TPP), sulfur-trioctylamine (S-TOA), sulfur-octadecene (S-ODE), sulfur-diphenylphosphine (S-DPP), sulfur-oleylamine (S-oleylamine), sulfur-dodecylamine (S-dodecylamine), dodecanethiol (DDT), octanethiol, selenium-trioctylphosphine (Se-TOP), selenium-tributylphosphine (Se-TBP), selenium-triphenylphosphine (Se-TPP), selenium-octadecene (Se-ODE), selenium-diphenylphosphine (Se-DPP), selenium-dodecylamine(Se-Dodecylamine), tellurium-tributylphosphine (Te-TBP), tellurium-triphenylphosphine (Te-TPP), tellurium-trioctylphosphine (Te-TOP), tellurium-octadecene (Te-ODE), tellurium-diphenylphosphine (Te-DPP), tellurium-oleylamine (Te-Oleylamine), tellurium-dodecylamine (Te-dodecylamine), or a combination thereof.

The solvent may include a C6 to C22 primary alkylamine, a C6 to C22 secondary alkylamine, a C6 to C40 tertiary alkylamine, a nitrogen-containing heterocyclic compound, a C6 to C40 olefin, a C6 to C40 aliphatic hydrocarbon, an aromatic hydrocarbon substituted with a C6 to C30 alkyl group, a phosphine substituted with a C6 to C22 alkyl group, a phosphine oxide substituted with a C6 to C22 alkyl group, a C12 to C22 aromatic ether, or a combination thereof. The solvent may be selected considering the precursors and organic ligands. The solvent may include hexadecylamine, dioctylamine, trioctylamine, pyridine, octadecene, hexadecane, octadecane, squalane, phenyldodecane, phenyltetradecane, phenyl hexadecane, trioctylphosphine, trioctylphosphine oxide, phenyl ether, benzyl ether, or a combination thereof, but it is not limited thereto.

The reaction may be performed under any suitable conditions by modifying a temperature or a time, without a particular limit. For example, the reaction may be performed at a temperature of greater than or equal to about 50° C., for example, a temperature of about 100° C. to about 240° C., for greater than or equal to about 1 second, for example, about 10 seconds to about 20 minutes), but it is not limited thereto. The reaction may be performed in an inert gas atmosphere, in an oxygen atmosphere, or in a vacuum, but it is not limited thereto.

Figure 4:
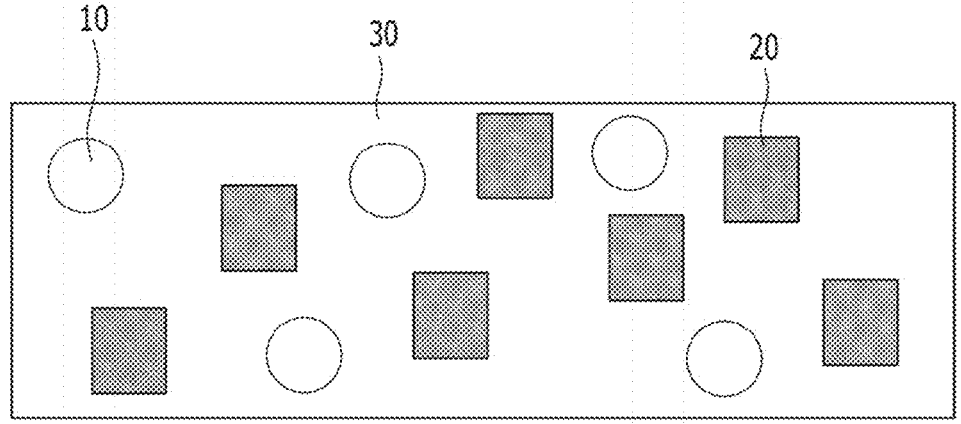
FIG. 4 is a schematic view showing a cross-section of a quantum dot-polymer composite, according to an embodiment.

In the device of some embodiments, the photoconversion layer may include a polymer matrix and the first quantum dot and the second quantum dot may be dispersed in the polymer matrix. FIG. 4 shows a cross-sectional view of the photoconversion layer in some non-limiting embodiments. As shown in FIG. 4, the first quantum dot 10 and the second quantum dot 20 are dispersed in the polymer matrix 30.

The polymer matrix may be a thiol-ene polymer, a (meth) acrylate-based polymer, a urethane-based resin, an epoxy-based polymer, a vinyl-based polymer, a silicone resin, or a combination thereof. The thiol-ene polymer is disclosed in US-2012-0001217-A1, which is incorporated herein by reference in its entirety. The (meth)acrylate-based polymer such as poly(methyl methacrylate (PMMA), the urethane-based resin such as an urethane acrylate, the epoxy-based polymer, the vinyl-based polymer such as styrene, and the silicone resin such as polydimethylsiloxane (PDMS) may be synthesized by known methods, or may be commercially available.

An amount of the first and second quantum dot in the polymer matrix may be appropriately selected and is not particularly limited. For example, the total combined amount of the first and second quantum dot in the polymer matrix may be greater than or equal to about 0.1 weight percent (wt %), for example, greater than or equal to about 1 wt %, greater than or equal to about 3 wt %, greater than or equal to about 5 wt %, greater than or equal to about 7 wt %, greater than or equal to about 10 wt % and less than or equal to about 60 wt %, for example, less than or equal to about 55 wt %, less than or equal to about 50 wt %, less than or equal to about 45 wt %, less than or equal to about 40 wt %, less than or equal to about 35 wt %, or less than or equal to about 30 wt %, based on the total weight of the quantum dot polymer composite, e.g., the photoconversion layer, but is not limited thereto. A ratio between the amount of the first quantum dot and the amount of the second quantum dot is not particularly limited and may be appropriately selected in light of a desired emission spectrum of the resulting photoconversion layer. In some embodiments, the first/second quantum dots may be mixed (e.g., randomly dispersed) in the polymer matrix. In other embodiments, the photoconversion layer may be patterned to have at least two different sections and the first and the second quantum dots may be disposed in different sections, respectively.

A method of manufacturing a quantum dot polymer composite (e.g., as the photoconversion layer) may include mixing a dispersion including the quantum dot with a solution including a polymer or a polymer precursor (e.g., a monomer), removing a solvent therefrom, and optionally conducting a polymerization reaction or a curing process, but is not limited thereto. The quantum dot-polymer composite thus obtained may be in a form of a quantum dot sheet (QD sheet).

The quantum dot polymer composite (e.g., the photoconversion layer) may be patterned to have a first color section including the first quantum dot and a second color section including the second quantum dot. Methods of patterning are not particularly limited. For example, a solution including quantum dots and a polymer may be patterned via an ink-jet method or a screen printing method to form a patterned quantum dot polymer composite, but the method is not limited thereto. Alternatively, a method using a photoresist may be used to form a desired pattern.

Figure 11:
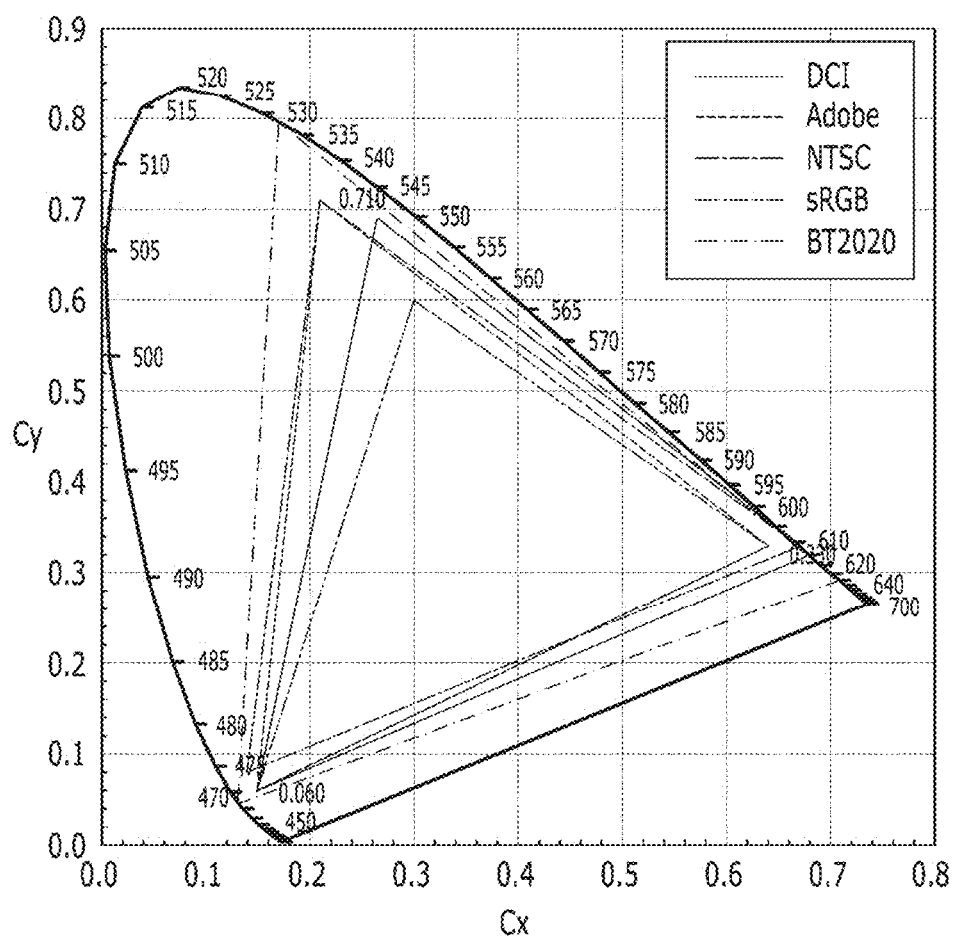
FIG. 11 is a chromaticity diagram of color coordinate values (Cx, Cy), showing various standards for evaluating a color gamut ratio in a CIE color space across a color reproduction range.

The photoconversion layer may show enhanced luminous properties. For example, BT2020 is a reference standard for color reproduction with respect to a next generation display. The BT2020 has a significantly broader color gamut as compared to the conventional reference standards such as NTSC, Adobe, DCI, or sRGB (see FIG. 11). In the electronic device of some embodiments, the light emitted from the photoconversion layer may have a color gamut ratio that is greater than or equal to about 87% with respect to BT2020 in the CIE1931 color space. The light emitted from the photoconversion layer may a color gamut ratio that is greater than or equal to about 88% with respect to BT2020 in the CIE1931 color space. The light emitted from the photoconversion layer may a color gamut ratio that is greater than or equal to about 90% with respect to BT2020 in the CIE1931 color space. The color coordinate Cy of the green light among the light emitted from the photoconversion layer may be greater than or equal to about 0.73.

Hereinafter, a structure of an electronic device in some embodiments will be explained in further detail, with reference to FIGS. 5 through 10.

The electronic device may have a light source 110 having a peak emission wavelength of about 440 nm to about 480 nm and a photoconversion layer 130 capable of converting the light emitted from the light source into white light. Details of the photoconversion layer are the same as set forth above. The light source may include an LED light source. Depending on the final structure of the device, the light source may constitute a backlight unit. In some other embodiments, the light source and the photoconversion layer may form a backlight unit.

In some embodiments, the backlight unit may be an edge-type backlight unit. In an embodiment, for example, the backlight unit may include a reflector (not shown), a light guide panel (not shown) disposed on the reflector in order to guide the light from the light source to the liquid crystal panel 200, and/or one or more optical sheets (not shown) such as a diffusion plate, a prism sheet, or the like, disposed on the light guide, but is not limited thereto. In an alternative embodiment, the backlight unit may be a direct lighting type of backlight unit. For example, the backlight unit may have a reflector (not shown) and a plurality of fluorescent lamps disposed on the reflector with a predetermined (e.g., constant) interval therebetween; or may have a light emitting diode ("LED")-driving substrate including a plurality of LEDs, and may further include a diffusion plate, and optionally one or more optical sheets on the diffusion plate.

Figure 5:
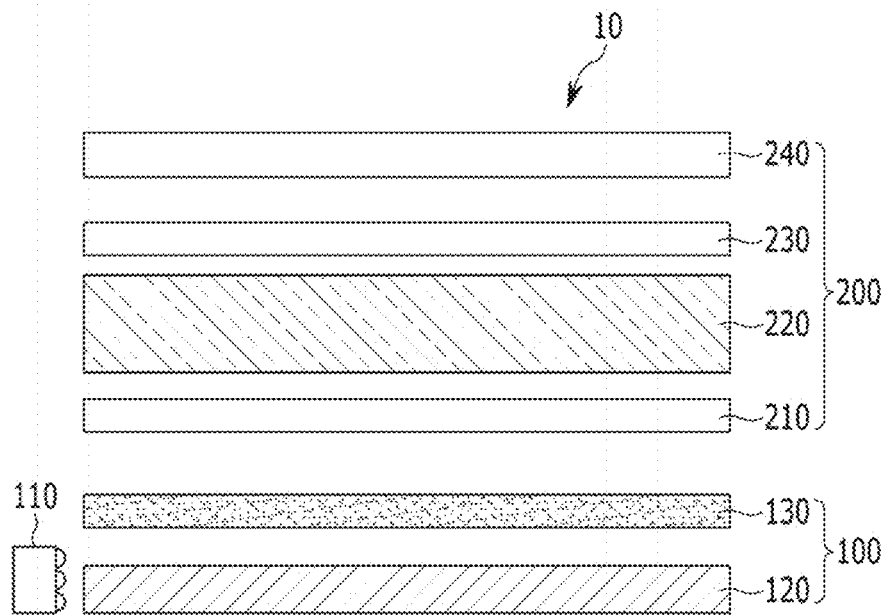
FIG. 5 is a schematic view showing a cross-section of an electronic device, according to an embodiment.
Figure 7:
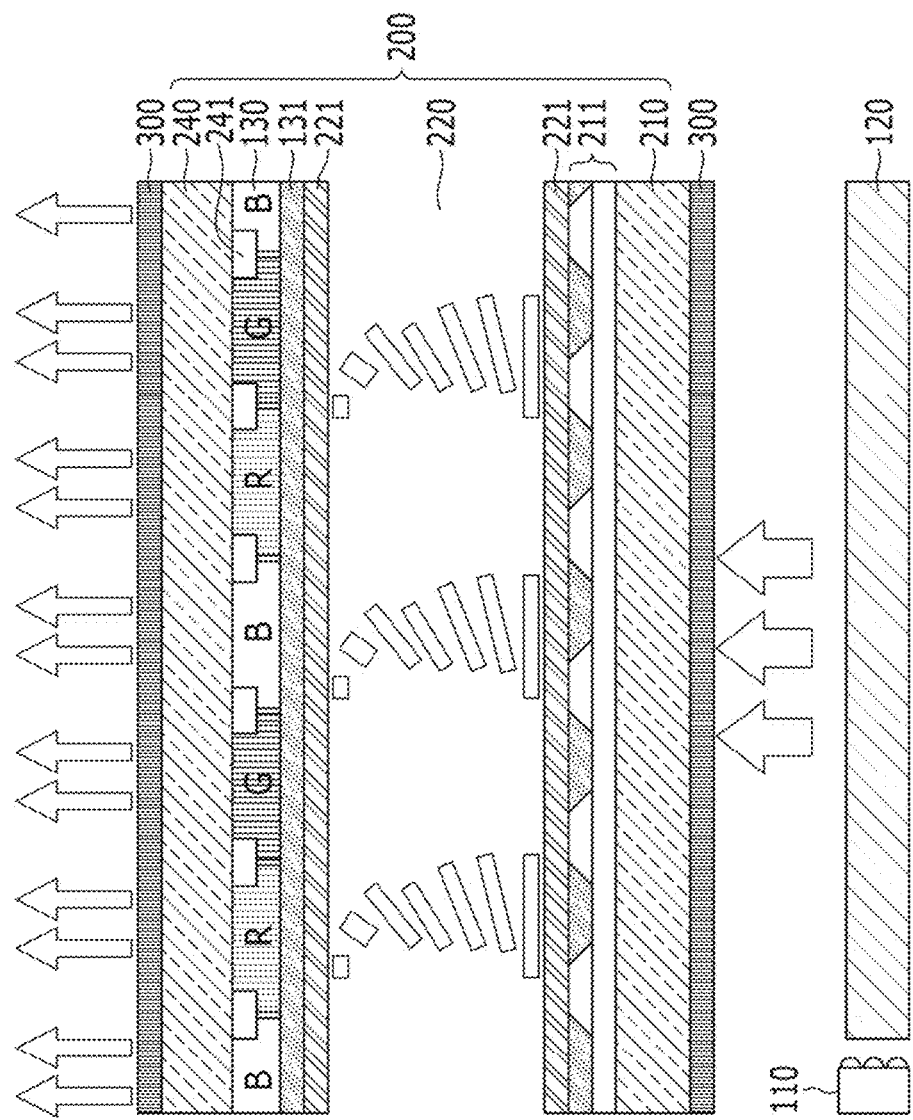
FIG. 7 is a schematic view showing a cross-section of a LCD, according to still another embodiment.

Referring to FIG. 5 and FIG. 7, a light guide panel 120 may be disposed between the light source 110 and the photoconversion layer 130 or between the light source 110 and the liquid crystal panel 200. The light guide panel may direct the light emitted from the light source 110 toward the photoconversion layer 130 or toward the liquid crystal panel 200. In such case, the light source 110 may include a plurality of LED chips emitting light of a desired wavelength, for example, a wavelength of about 440 nm to about 480 nm. For example, the light source 110 may include an LED light source emitting blue light. A reflector (not shown) may be disposed under the lower surface of the light guide panel 120. In FIG. 5, the photoconversion layer 130 may be located and spaced at a predetermined distance from the light source 110, converting the light emitted from the light source into white light. The backlight unit may have a structure which includes a light guide and an optical sheet, a reflector, or the like, but is not limited thereto.

The backlight unit 100 may further include a diffusion plate (not shown) over the light guide panel 120. The photoconversion layer 130 may be disposed either between the light guide panel 120 and the diffusion plate or over the diffusion plate (e.g., over a surface opposite to the surface facing the light guide panel 120). The light emitted from the light source 110 may pass through the photoconversion layer 130 to produce white light in which blue light, green light, and red light are mixed. In this case, changing the composition, the size, and the weight ratio of the first quantum dot and the second quantum dot may allow for control over the mixing of the blue light, the green light and the red light at a desired ratio, thereby making it possible to obtain white light having an improved color gamut ratio and an increased color purity. Alternatively, as shown in FIG. 7 and the like, the light source 110 emits blue light, which is directed into the liquid crystal panel.

The electronic device may further include a liquid crystal panel 200 and the light emitted from the backlight unit 100 may enter the liquid crystal panel 200, pass through one or more color filter to form an image having a desired color on a screen. The color filter may be an absorption type or photoluminescent type color filter.

The liquid crystal panel 200 may include a lower substrate 210, an upper substrate 240 disposed opposite to the lower substrate, and a liquid crystal layer 220 interposed between the upper and lower substrates.

Figure 6:
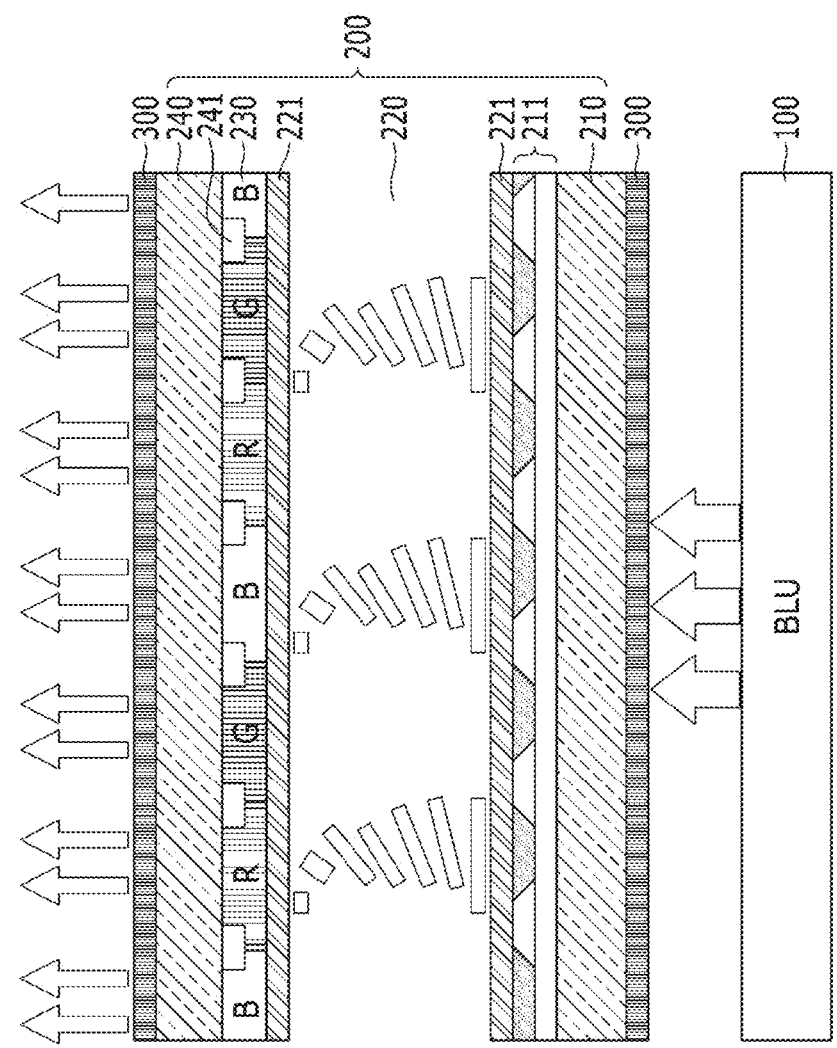
FIG. 6 is a schematic view showing a cross-section of a liquid crystal display ("LCD"), according to another embodiment.

Referring to FIG. 5 and FIG. 6, the liquid crystal panel may include an absorption type color filter 230, the photoconversion layer may emit white light, and the liquid crystal panel may be disposed on the photoconversion layer a manner such that the white light passes through the liquid crystal layer.

An optical element 300 may be disposed above and/or below the liquid crystal panel 200. The optical element 300 may include a polarizer, and may be a polarizing plate.

The lower substrate 210, also referred to be as an array substrate, may include a transparent insulation material substrate. The transparent insulation material substrate may include a glass substrate, a polymer substrate including a polyester such as polyethylene terephthalate ("PET") or polyethylene naphthalate ("PEN"), a polycarbonate, a polyacrylate, a polysiloxane, or a combination thereof, or an inorganic material substrate such as, $Al_2O_3$, ZnO, and the like).

A wire plate 211 may be disposed on an internal surface, e.g., a top surface, of the lower substrate 210. The wire plate 211 may include a plurality of gate wires (not shown) and data wires (not shown), a thin film transistor (not shown) disposed adjacent to a crossing region of gate wires and data wires, and a pixel electrode (not shown) for each pixel area, but is not limited thereto. In one embodiment, for example, pixel areas may be defined by the gate and data wires. The wire plate 211 may have any suitable structure or feature, and is not particularly limited.

The liquid crystal layer 220 may be disposed on the wire plate 211. The liquid crystal layer 220 may include an alignment layer 221 on opposite surfaces thereof for initial alignment of the liquid crystal material included in the liquid crystal layer 220. The liquid crystal material and the alignment layer 221 may have any appropriate structure or feature and details thereof, such as the composition of the liquid crystal material, the composition of the alignment layer material, a method of forming the liquid crystal layer, and a thickness of the liquid crystal layer, are not particularly limited.

The optical element 300 (polarizing plate) may be disposed on an external surface of the lower substrate 210, e.g., under the lower substrate 210. Materials and structures of the polarizing plate 300 are not particularly limited. The backlight unit 100 that emits blue light may be disposed under the polarizing plate 300.

The upper substrate 240 (also referred to as a color filter substrate) may be a transparent insulation material substrate. The transparent insulation material substrate may include a glass substrate, a polymer substrate including a polyester such as PET and PEN, a polycarbonate, a polyacrylate, a polysiloxane, or a combination thereof, or an inorganic material substrate such as $Al_2O_3$, ZnO, and the like). The optical element 300 may be disposed on a surface (e.g. a top surface) of the upper substrate 240. The optical element 300 on the surface of the upper substrate may be included for maintaining polarization of light emitted from the color filter layer. In some embodiments, for example, the optical element 300 may be a polarizer. The polarizer may include triacetyl cellulose ("TAC"), having a thin thickness of less than or equal to about 200 micrometers (pm), but is not limited thereto. In an alternative embodiment, the optical element 300 may be a refractive index-controlling coating without a polarization function.

A black matrix 241 having an opening defined therethrough may be disposed on the upper substrate 240, e.g., the bottom or the top surface of the upper substrate 240, and may be positioned so as to cover a gate line, a data line, a thin film transistor, or the like, of the wire plate 211 disposed on the lower substrate 210. In one exemplary embodiment, for example, the black matrix 241 may have a lattice shape.

An absorption type color filter layer 230 including a first color section (a red color filter, R) configured for passing red light, a second color section (a green color filter, G) configured for passing green light, and a third color section (a blue color filter, B) configured for passing blue light may be disposed over the black matrix 241 (e.g., in the openings of the lattice structure of the black matrix 241).

In some embodiments, the green filter (G) of the absorption type color filter may have a normalized transmission ratio of less than or equal to about 0.2, for example, less than or equal to about 0.1, or for example, zero (0), with respect to light of a wavelength of 500 nm or lower, for example, with respect to light of a wavelength of 480 nm or lower. The blue filter (B) of the absorption type color filter may have a normalized transmission ratio of less than or equal to about 0.2, for example, less than or equal to about 0.1, or for example, zero (0), with respect to light of a wavelength of 520 nm or higher.

As used herein, the normalized transmission ratio is calculated based on the maximum transmission thereof, which is assumed to be one (1). The spectrum of the light that is emitted from the photoconversion layer and passes through the second color section (G) may not include an emission peak having an intensity of greater than about 0.096, for example, for example, greater than about 0.1 at a wavelength of less than about 500 nm. The spectrum of the light that is emitted from the photoconversion layer and passes through the third color section (B) may not include an emission peak having an intensity of greater than about 0.13, for example, greater than 0.15 at a wavelength of greater than about 500 nm. When the absorption color filter having the foregoing properties is used, the display device may realize a greater color gamut and may have an enhanced color gamut ratio under the BT2020 standard. As used herein, the normalized intensity is a peak intensity that is calculated based on the maximum peak intensity, which is assumed to be one (1).

The first color section, the second color section, and the third color section of the absorption type color filter 230 may be repeated on the upper substrate 240 to correspond to the pixel regions defined in the wire plate 211.

In other embodiments, the liquid crystal panel 200 included in the electronic device does not include an absorption type color filter and the photoconversion layer 130 is patterned in such a manner that it may act as a photoluminescent color filter layer when disposed on the top or bottom surface of the upper substrate 240 of the liquid crystal panel. A transparent common electrode 131 may be disposed on the photoconversion layer 130 (e.g., photoluminescent color filter layer). (See for example, FIG. 6)

For example, the photoluminescent color filter layer (e.g., the photoconversion layer 130) may include a pattern having a first color section (R) emitting red light having a peak emission wavelength (e.g., a maximum peak emission wavelength) of about 620 nm to about 650 nm, a second color section (G) emitting green light having a peak emission wavelength (e.g., a maximum peak emission wavelength) of about 500 nm to about 550 nm. The pattern may further include a third color section (B) emitting blue light having a peak emission wavelength (e.g., a maximum peak emission wavelength) of about 440 nm to about 480 nm. If desired, the photoluminescent color filter layer may further include a fourth color section (e.g., a fourth color filter) for emitting other colors which are different from the colors of the red, green and blue light, for example, colors such as cyan, magenta, and yellow. The photoluminescent color filter layer may include a quantum dot pattern or a quantum dot polymer composite pattern. The quantum dot pattern and the quantum dot polymer composite pattern may be formed using the method disclosed in U.S. Pat. No. 7,199,393, which is incorporated herein by reference in its entirety, but the method is not limited thereto. The quantum dot polymer composite pattern may be formed, for example, via a patterning process involving a use of a photoresist that includes preparing a quantum dot containing photosensitive composition, forming a thin film, exposing the film, and developing the exposed film. However, the patterning process is not limited thereto.

Figure 37:
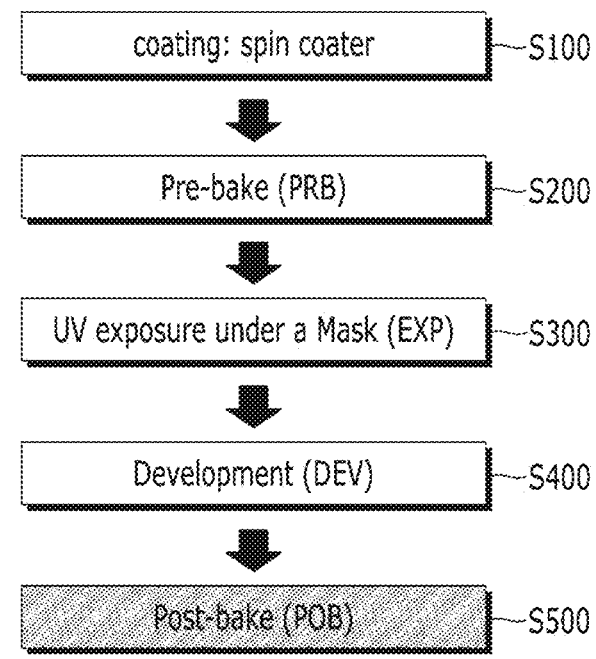
FIG. 37 is a flow diagram of an exemplary process of manufacturing a quantum dot-polymer composite based color filter (e.g., a patterned light conversion layer).
Figure 37:

In some embodiments, a pattern for the photoluminescent color filter layer may be formed in the manner schematically illustrated in FIG. 37, and described below.

For example, the patterning may be carried out in the following manner:

[1] A toluene dispersion of quantum dots (e.g., InP/ZnS including an organic ligand such as oleic acid bound to a surface thereof) emitting red light is prepared. The toluene dispersion including 50 grams (g) of the quantum dot is mixed with 100 g of a binder solution to provide a quantum dot-binder dispersion. The binder solution may include a four membered copolymer of methacrylic acid, benzyl methacrylate, hydroxyethyl methacrylate, and styrene (acid value: 130 milligrams (mg) per gram of KOH (mg KOH/g), a weight average molecular weight: 8,000, a molar ratio of acrylic acid:benzyl methacrylate:hydroxyethyl methacrylate:styrene=61.5%:12%:16.3%:10.2%) in a solvent (polypropylene glycol monomethyl ether acetate having a concentration of 30 percent by weight, wt %).

To the prepared quantum dot-binder dispersion, the following may be added to obtain a photosensitive composition: glycol di-3-mercaptopropionate, hexaacrylate having the structure below (as a photopolymerizable monomer), 1 g of an oxime ester compound (as an initiator), $TiO_2$ (as a light diffusing agent), and propylene glycol monomethyl ether acetate (PGMEA) (as a solvent).

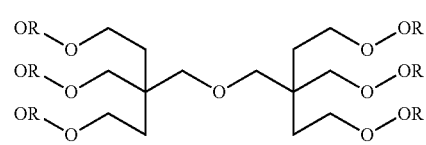

wherein,

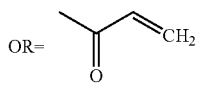

The photosensitive composition thus obtained is spin-coated on a glass substrate to provide a film (S100). The obtained film is pre-baked at 100° C. (S200). The pre-baked film is irradiated with light (wavelength: 365 nanometers (nm), intensity: 60 millijoules, mJ) for 1 s under a mask having a predetermined pattern (S300) and developed by a potassium hydroxide-diluted aqueous solution (concentration: 0.043%) to provide a pattern (S400). The obtained pattern is subjected to 30 min of heating at 180° C. to obtain a pattern of red (R) quantum dot polymer composite (S500).

[2] A pattern of green (G) quantum dot polymer composite is prepared in the same manner of item [1] except for using a toluene dispersion of a perovskite quantum dot emitting green light.

[3] A pattern of polymer composite (B) is prepared in the same manner as set forth in item [1] except the quantum dot is not used.

Referring FIG. 7, the electronic device of some embodiments (e.g., the photoluminescent liquid crystal display) may include a liquid crystal panel 200, an optical element 300 (e.g., a polarizing plate) disposed above and below the liquid crystal panel 200, and a backlight unit including a light source 110 emitting blue light and disposed under the lower optical element 300. The liquid crystal panel 200 includes a lower substrate 210, an upper substrate 240, a liquid crystal layer 220 interposed between the upper and lower substrates, and a photoconversion layer 130 disposed on the bottom surface of the upper substrate 240 as a photoluminescent color filter layer.

Figure 8:
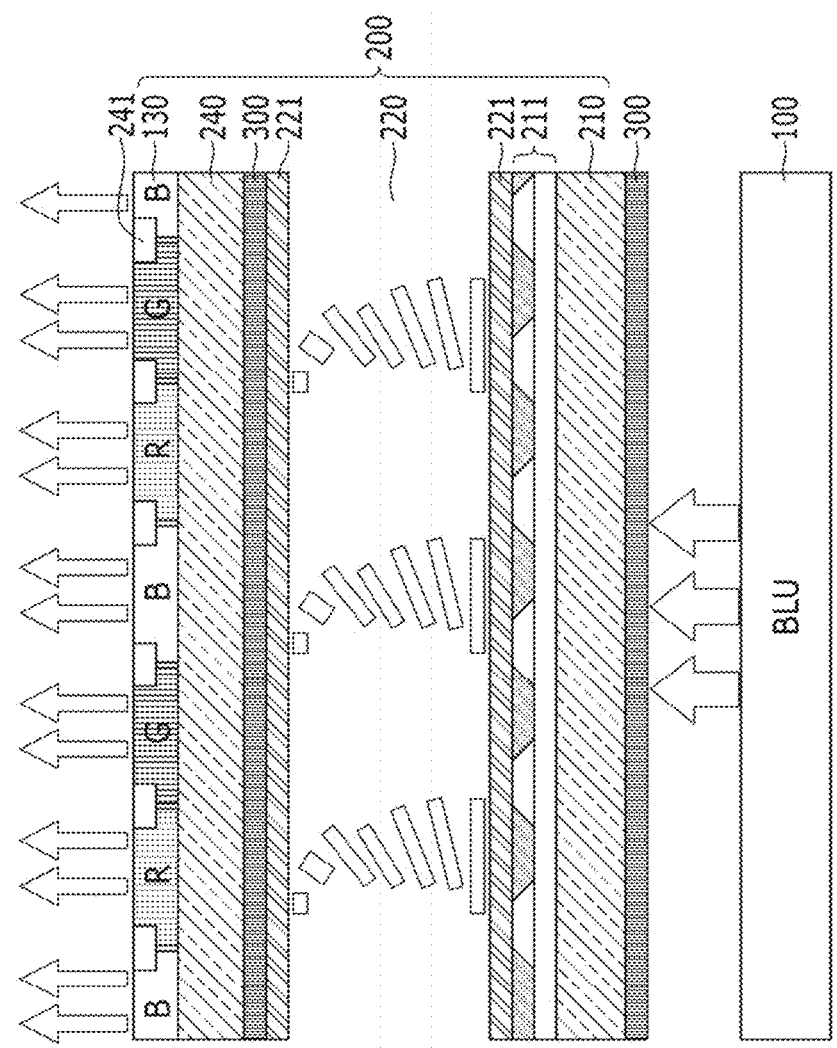
FIG. 8 is a schematic view showing a cross-section of a LCD, according to still another embodiment.
Figure 9:
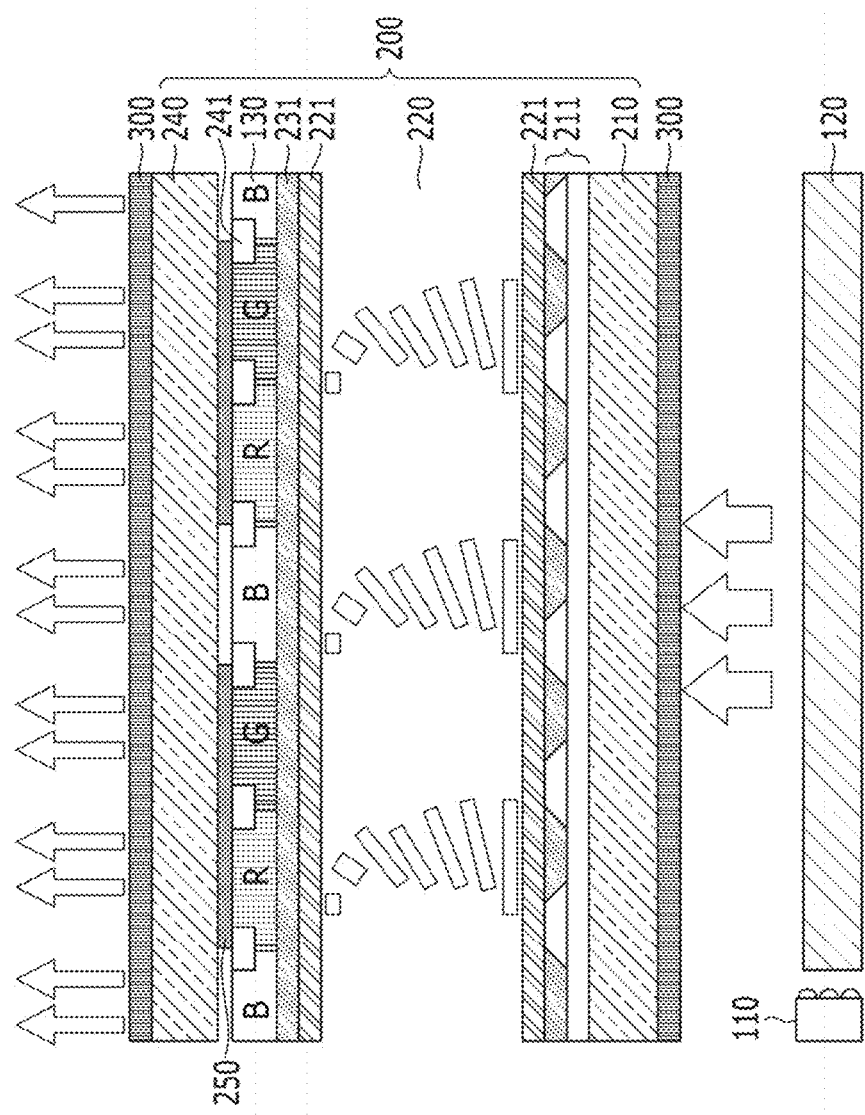
FIG. 9 is a schematic view showing a cross-section of a LCD, according to still yet another embodiment.
Figure 10:
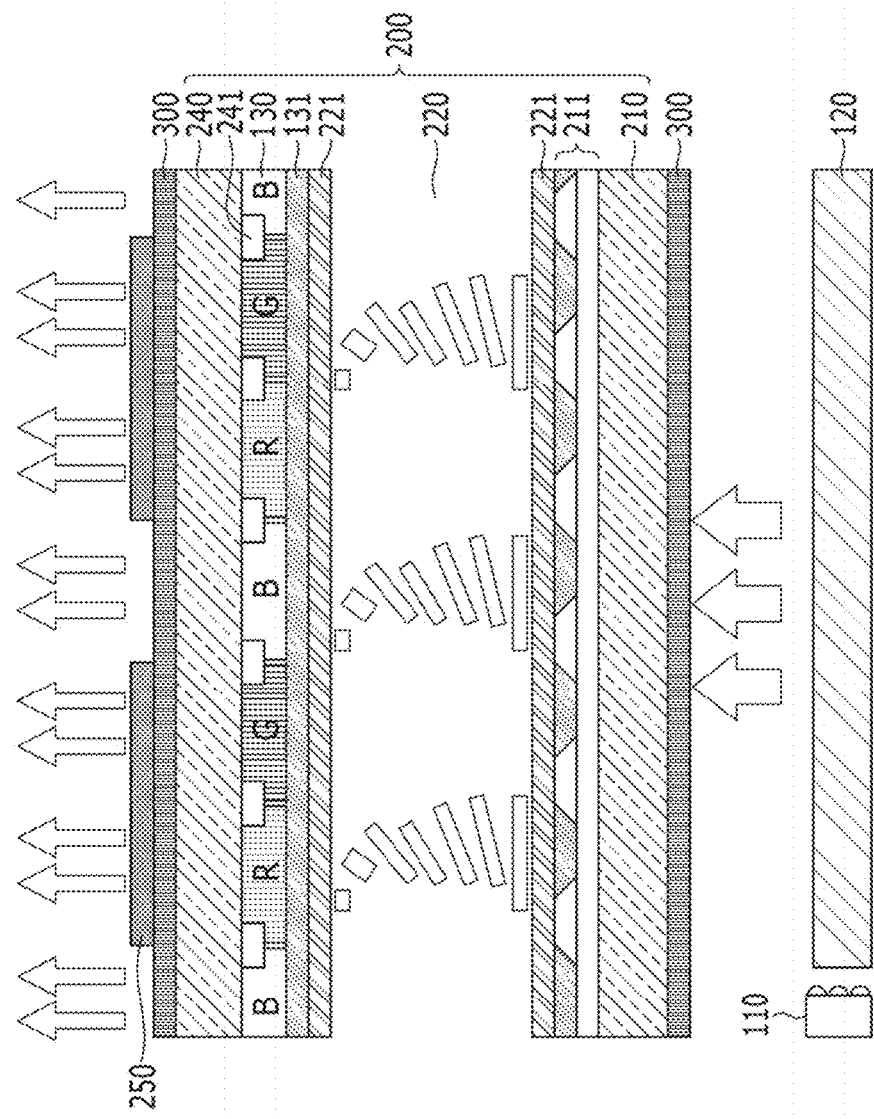
FIG. 10 is a schematic view showing a cross-section of a LCD, according to another embodiment.

In other embodiments, referring to FIG. 8, the liquid crystal panel 200 includes a lower substrate 210, an upper substrate 240, a liquid crystal layer 220 interposed between the upper and lower substrates, and a photoconversion layer 130 disposed on the top surface of the upper substrate 240 as a photoluminescent color filter layer.

In some embodiments, the electronic device may further include a blue light blocking layer 250 (or blue filter BF). The blue light blocking layer may be disposed between the bottom surface of the first color filter (R) and the second color filter (G) and the upper substrate 240 (see FIG. 9). Alternatively, the blue light blocking layer 250 may be disposed on the optical element 300 (see FIG. 10). In an embodiment, the blue light blocking layer 250 may be a sheet having an opening in a region corresponding to a pixel area (third color filter) expressing blue. In such an embodiment, the blue light blocking layer 250 may be disposed on a region corresponding to the first and second color filters. In one embodiment, for example, the blue light blocking layer 250 may be formed by alternately stacking at least two layers having different refractive indexes, and the blue light blocking layer 250 transmits light wavelengths other than the blue wavelength band and blocks the blue wavelength band. The blocked light of blue wavelength may be reflected and recycled. The blue light blocking layer 250 may prevent light emitted from the blue light source 110 of the backlight unit from being directly emitted to the outside.

The electronic device of the embodiments may show improved brightness, for example, a brightness which is two to three times higher than that of an electronic device using a conventional white light source, we well as improved display quality (e.g., improved color reproducibility).

Hereinafter, the embodiments are illustrated in more detail with reference to examples. However, they are example embodiments of the present invention, and the present invention is not limited thereto.

EXAMPLES

Analysis
[1] Photoluminescence Analysis
A Hitachi F-7000 spectrometer is used to perform a photoluminescence spectrum analysis by irradiating light having a wavelength of 458 nm. Based on the obtained photoluminescence spectrum, a maximum photoluminescence peak wavelength, quantum efficiency, and a full width at half maximum (FWHM) are calculated.
[2] TEM Analysis
A transmission electron microscope image is obtained by using a TEM-TITAN-80-300 (FEI) equipment at an acceleration voltage of 300 KV. From the TEM analysis results, an average diameter of a quantum dot may be measured.
[3] X-Ray Diffraction Analysis
An X-ray diffraction spectrum is obtained using a Philips XPert PRO equipment.
[4] EDX Analysis
An EDS measuring device mounted on the TEM-TITAN-80-300 (FEI) is used to perform an energy-dispersing X-ray spectrum analysis.
[5] XPS Analysis
Quantum 2000 made by Physical Electronics, Inc. is used to perform an XPS element analysis under a condition of an acceleration voltage: 0.5-15 kiloelectron volts (keV), 300 watts (W), and a minimum analysis area: 200×200 square micrometer ($\mu m^2$).
[6] ICP Analysis
ICPS-8100 (Shimadzu Corp.) is used to perform an inductively-coupled plasma-element releasing spectrum analysis.
Synthesis of First Quantum Dot:

Reference Example 1: Preparation of Green Quantum Dot (1) 0.2 millimole (mmol) of indium acetate, 0.6 mmol of palmitic acid, and 10 milliliters (mL) of 1-octadecene are placed in a flask, subjected to a vacuum state at 120° C. for one hour, and then heated to 280° C. after the atmosphere in the flask is exchanged with $N_2$. Then, a mixed solution of 0.1 mmol of tris(trimethylsilyl)phosphine (TMS3P) and 0.5 mL of trioctylphosphine (TOP) is quickly injected and the reaction proceeds for 20 minutes. The reaction mixture is rapidly cooled to room temperature and acetone is added thereto to precipitate nanocrystals, which are then separated by centrifugation and dispersed in toluene. The first absorption maximum in UV-VIS spectrum of the InP core nanocrystals thus prepared is in the range of 420-600 nm.

0.3 mmol (0.056 g) of zinc acetate, 0.6 mmol (0.189 g) of oleic acid, and 10 mL of trioctylamine are placed in a flask, subjected to a vacuum state at 120° C. for 10 minutes, and then heated to 220° C. after the atmosphere in the flask is exchanged with $N_2$. Then, a toluene dispersion of the prepared InP core nanocrystals (optical density: 0.15) and 0.6 mmol sulfur trioctylphosphine (S-TOP) are added to the flask and then the resulting mixture is heated to 280° C., and the reaction proceeds for 30 minutes. After the reaction, the reaction solution is quickly cooled to room temperature to obtain a reaction mixture including InP/ZnS semiconductor nanocrystals.

(2) An excess amount of ethanol is added to the reaction mixture including the InP/ZnS semiconductor nanocrystals, which is then centrifuged to remove an extra organic material in the reaction mixture of the semiconductor nanocrystals. After centrifugation, the supernatant is discarded and the precipitate is dispersed in hexane again, and an excess amount of ethanol is added thereto and the resulting mixture is centrifuged again. The precipitate obtained from the centrifugation is dried and dispersed in chloroform. A UV-vis absorption wavelength of the resulting quantum dot is about 498 nm, its maximum peak emission wavelength is about 520 nm, its quantum yield thereof is about 90%, and its FWHM is about 38 nm.

Reference Example 2: Preparation of Red Quantum Dot

A quantum dot emitting red light is prepared in the same manner except for varying a ratio between the precursors. A UV-vis absorption wavelength of the resulting quantum dot is about 625 nm, its maximum peak emission wavelength is about 645 nm, its quantum yield thereof is about 95%, and its FWHM is about 40 nm.
Synthesis of Second Quantum Dot:

Reference Example 3: Synthesis of Perovskite Green Quantum Dot Having a Composition of $CsPbBr_{3+\alpha}$ Doped with Zn and Se

[1] Preparation of Cs Precursor Solution $Cs_2CO_3$ (0.8 grams (g), Sigma-Aldrich, 99%) is put into a 100 milliliter (mL) 3-neck flask along with octadecene (30 mL, Sigma-Aldrich, 90%, ODE) and oleic acid (2.5 mL, Sigma-Aldrich, 90%, OA), and the mixture is dried at 120° C. for one hour, and subsequently heated at 150° C. under $N_2$ to react the $Cs_2CO_3$ with the oleic acid and thereby obtain a first precursor of Cs-oleate. The Cs-oleate is precipitated from the ODE at room temperature and heated up to 100° C. before being injected into the reaction solution.

[2] Preparation of a Solution Containing a Second Precursor and a First Additive The ODE (50 mL), $PbBr_2$ (0.69 g, Sigma-Aldrich Co., Ltd., 99.999%), and $ZnBr_2$ (0.42 g, Sigma-Aldrich Co., Ltd., 99.999%) are placed in a 250 mL 3-neck flask and dried at 120° C. for one hour. Then, dry oleylamine (5 mL, STREM Chemicals, 95%, OLA) and dry OA (5 mL) are injected thereinto at 120° C. under a nitrogen atmosphere, and the obtained mixture is stirred to dissolve the $PbBr_2$ and the $ZnBr_2$ to prepare a solution containing a second precursor and a first additive.

[3] The obtained solution containing the second precursor and the first additive is heated at a temperature of 200° C., the first precursor solution obtained from [1] is rapidly injected thereto, and then Se-TOP (1.6 mmol) is added thereto. The Se-TOP is prepared as a 0.4 molar (M) solution by dissolving Se powder (RND Korea Co., LTD., 99.999%) in Tri-n-octylphosphine (STREM Chemicals, 97%, TOP). After five minutes, the reaction solution is rapidly cooled to room temperature.

[4] Subsequently, as a non-solvent, isopropanol is added to the cooled reaction solution to form a precipitate, which is then washed. The precipitate is centrifuged to obtain a quantum dot, and the obtained quantum dot is dispersed in toluene and lauryl methacrylate, respectively. A Transmission Electron Microscopic (TEM) analysis is carried out for the obtained quantum dots. The results of the TEM analysis confirm that the obtained quantum dots have a cubic or rectangular cuboid shape and their average size is about 10 nm.

For the obtained quantum dots, an X-ray diffraction (XRD) analysis is carried out. The results of the XRD analysis confirm that the prepared quantum dots include a compound having a perovskite structure.

For the obtained quantum dots, a photoluminescence analysis is carried out. A UV-vis absorption wavelength of the resulting quantum dot is about 520 nm, its maximum peak emission wavelength is about 525 nm, its quantum yield thereof is about 95%, and its FWHM is about 22 nm.

The toluene dispersion including the quantum dots is kept in the air. A photoluminescence spectrum analysis of the quantum dots for the dispersion is performed both after 24 hours and after 48 hours and the results are summarized in Table 1.

Reference Example 4: Synthesis of Perovskite Green Quantum Dot Having a Composition of Se-Doped $CsPbBr_{3+\alpha}$ A quantum dot doped with Se and including $CsPbBr_{3+\alpha}$ is prepared in the same method as Reference Example 3, except for not using $ZnBr_2$ as a first additive, and a toluene dispersion including the prepared quantum dots are obtained. The obtained quantum dots have a cubic or rectangular cuboid shape and their average size is about 10 nm.

Reference Example 5: Synthesis of Perovskite Green Quantum Dot Having a Composition of Zn-Doped $CsPbBr_{3+\alpha}$ A quantum dot doped with Zn and including $CsPbBr_{3+\alpha}$ is prepared in the same method as Reference Example 1 except for not using the Se-TOP as a second additive, and the toluene dispersion each including the prepared quantum dots is obtained. The obtained quantum dots have a cubic or rectangular cuboid shape and their average size is about 10 nm.

The toluene dispersion is kept in the air. A photoluminescence spectrum analysis of the quantum dot for each of the dispersions is performed after 24 hours and after 48 hours, and the results are summarized in Table 1.

TABLE 1

| Sample | After dispersion in toluene | | | Toluene dispersion after 24 h | | | Toluene dispersion after 48 h | | |
|---|---|---|---|---|---|---|---|---|---|
| | $\lambda$ (nm)[a] | FWHM (nm) | QE | $\lambda$ (nm) | FWHM (nm) | QE | $\lambda$ (nm) | FWHM (nm) | QE |
| Reference Example 3 | 506 | 23 | 93 | 508 | 22 | 103 | 507 | 22 | 100 |

TABLE 1-continued

| | After dispersion in toluene | | | Toluene dispersion after 24 h | | | Toluene dispersion after 48 h | | |
|---|---|---|---|---|---|---|---|---|---|
| Sample | λ (nm)[a] | FWHM (nm) | QE | λ (nm) | FWHM (nm) | QE | λ (nm) | FWHM (nm) | QE |
| Reference Example 5 | 508 | 23 | 78 | 507 | 23 | 85 | 507 | 23 | 93 |

The results of Table 1 confirm that even when the quantum dots thus synthesized are washed with isopropanol and dispersed in toluene, they may maintain a relatively narrow FWHM and a suitable improvement in quantum efficiency (QE).

Reference Example 6: Synthesis of a Perovskite Quantum Dot Emitting Red Light and Having a Composition of Zn and Se-Doped $CsPbI_{3+\alpha}$ A perovskite quantum dot emitting red light is prepared in the same method as Reference Example 3, except for using $PbI_2$ and $ZnI_2$ instead of $PbBr_2$ and $ZnBr_2$. For the obtained quantum dots, a photoluminescence analysis is carried out. A UV-vis absorption wavelength of the resulting quantum dot is about 622 nm, its maximum peak emission wavelength is about 645 nm, its quantum yield thereof is about 90%, and its FWHM is about 46 nm.

Experimental Example 1

Element Analysis of Perovskite Quantum Dot

[1] TEM-EDX Analysis

For the quantum dots prepared in Reference Example 3, a TEM-EDX-analysis is carried out. As a result, in case of the quantum dot of Reference Example 3, an atomic ratio of the Br with respect to the Cs is 3.14. The aforementioned results confirm that the quantum dots of Reference Example 3 include an excess amount of halogen.

[2] XPS Analysis

For the quantum dots prepared in Reference Example 3, an XPS analysis is carried out. The results confirm that in case of the quantum dots of Reference Example 3, the atomic ratio of the Br with respect to Pb (Pb4f/Br3d) is 66.0%/22.6%. The results also confirm that the quantum dots of Reference Example 3 include an excess amount of the Br.

[3] ICP-AES Analysis

For the quantum dots of Reference Example 3, an ICP-AES analysis is carried out, and the results are shown below in Table 2:

TABLE 2

| | Mole ratio | | | ppm | | |
|---|---|---|---|---|---|---|
| Samples | Zn | Pb | Se | Zn | Pb | Se |
| Reference Example 3 | 0.115 | 0.8 | 0.085 | 0.04 | 0.95 | 0.04 |

The results confirm that the quantum dots of Reference Example 3 include Zn and Se.

Preparation of Photoconversion Layer, Production of Device, and Analysis of Luminous Properties Thereof Comparative Example 1

[1] Preparation of Photoconversion Layer 30 wt % of lauryl methacrylate, 36 wt % of tricyclodecane dimethanol diacrylate, 4 wt % of trimethylol propane triacrylate, 20 wt % of epoxy diacrylate oligomer (Manufacturer: Sartomer), 1 wt % of 1-hydroxy-cyclohexyl-phenyl-ketone, and 1 wt % of 2,4,6-trimethylbenzoyl-diphenyl-phosphine oxide are mixed to prepare a monomer and oligomer mixture. The mixture is de-foamed under vacuum.

The green quantum dot synthesized in Reference Example 1 and the red quantum dot synthesized in Reference Example 2 are mixed with an excess amount of ethanol again and centrifuged. A mixing ratio between the green quantum dot and the red quantum dot is about 5:4 as calculated from the volume of the dispersion and the optical density thereof. The separated quantum dots are dispersed in 0.15 g (10 wt % of the entire composition except for an initiator) of lauryl methacrylate, and then added to 1.35 g of the mixture prepared above, and vortexed to prepare a quantum dot composition.

About 1 g of the quantum dot composition thus prepared is drop-cast on a surface of a PET film sputtered with SiOx (purchased from I-component, hereinafter, a barrier film). Another barrier film is placed on the casted composition and a UV-curing (exposure to ultraviolet (UV) light) is carried out for 10 seconds (photo intensity: 100 milliwatts per square centimeter ($mW/cm^2$)) to provide a photoconversion layer.

[2] Production of Electronic Device

The photoconversion layer obtained in [1] is inserted between a light guide panel and an optical sheet of a 60-inch TV mounted with a blue LED having a peak emission wavelength of 449 nm, and then color filter 1 (manufactured from Samsung Display Co., Ltd.) is disposed on the optical sheet. The resulting TV is operated and luminance properties thereof are measured at a distance of about 45 centimeters (cm) with spectroradiometer (Konica Minolta Inc., CS-2000) to obtain a color coordinate value (Cx, Cy) and a color gamut.

Figure 12:
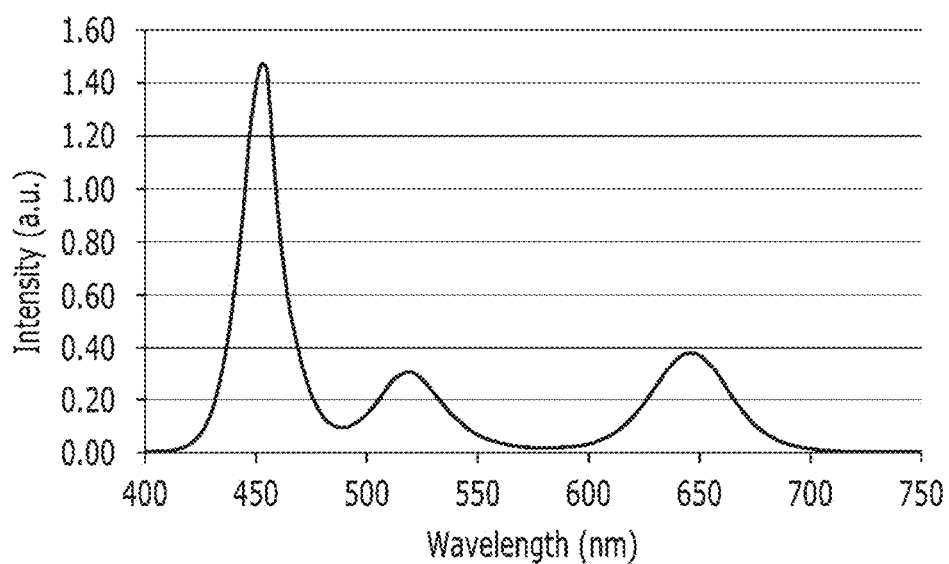
FIG. 12 is a graph of intensity (arbitrary units, a.u.) versus wavelength (nm), showing the light emission spectrum of a device prepared in accordance with Comparative Example 1.
Figure 13:
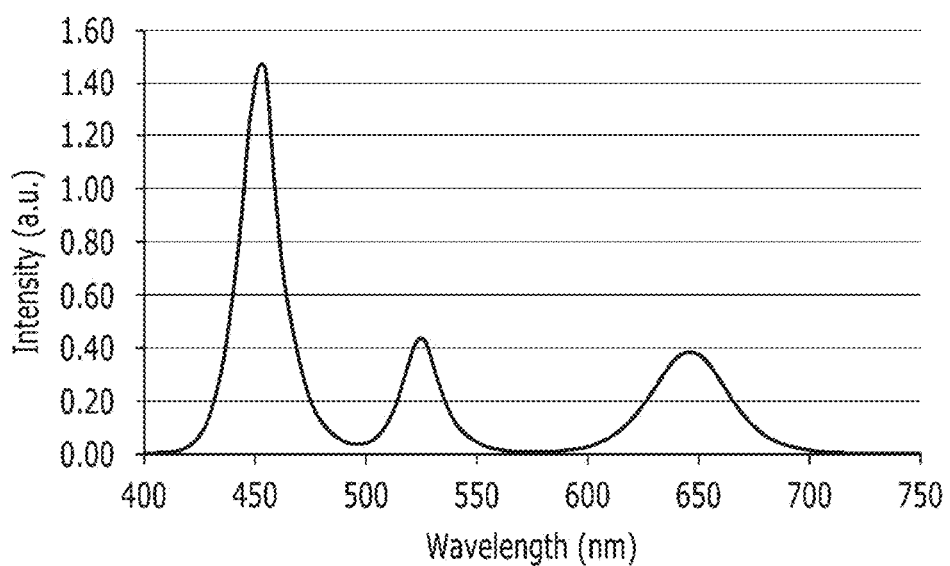
FIG. 13 is graph of intensity (a.u.) versus wavelength (nm), showing the light emission spectrum of a device prepared in accordance with Example 1.
Figure 14:
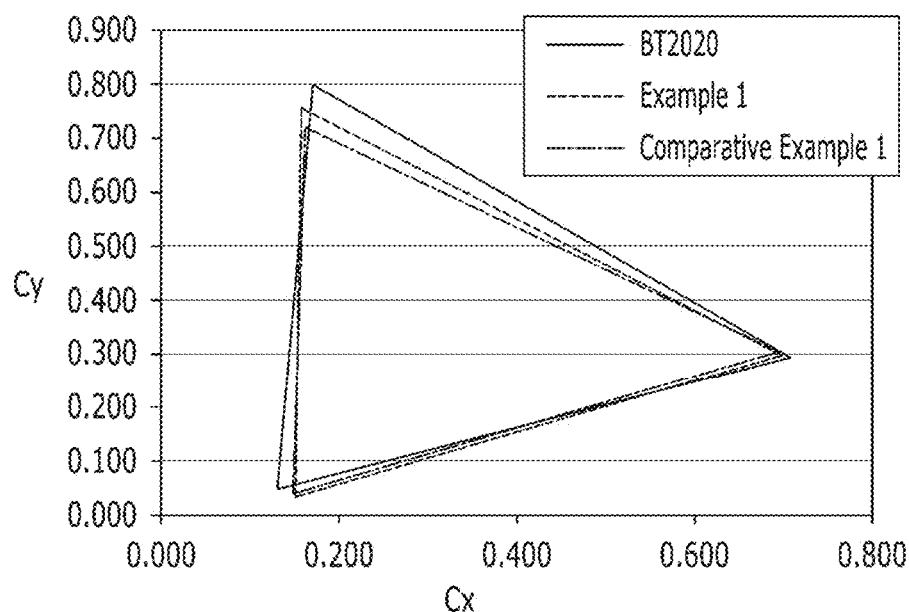
FIG. 14 is a chromaticity diagram of color coordinate values (Cx, Cy) showing a color gamut with respect to BT2020 standard for each of the devices prepared in accordance with Comparative Example 1 and Example 1.
Figure 15:
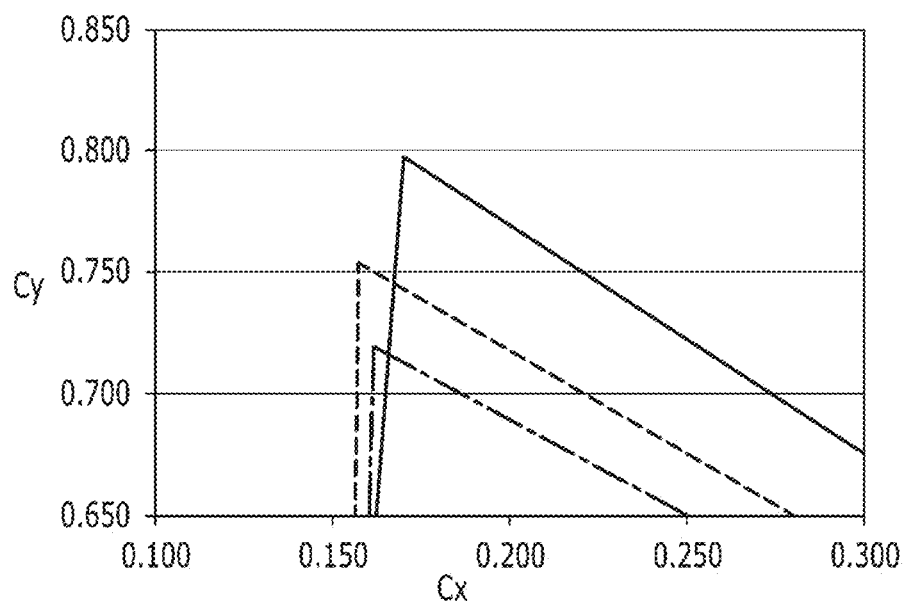
FIG. 15 is a chromaticity diagram of chromaticity coordinates (Cx, Cy) having a Cy value of greater than or equal to about 0.65 and a Cx value of 0.10 to 0.30, and showing a color gamut with respect to BT2020 standard for each of the devices prepared in accordance with Comparative Example 1 and Example 1.

The results are summarized in Table 3, Table 4, FIG. 12, FIG. 14, and FIG. 15.

Example 1

[1] Preparation of Photoconversion Layer

A monomer and oligomer mixture is prepared in the same manner as Comparative Example 1. The mixture thus prepared is de-foamed under vacuum.

A photoconversion layer is prepared in the same manner as set forth in Comparative Example 1 except for using the toluene dispersion of the red quantum dot synthesized in Reference Example 2 and the toluene dispersion of the green quantum dot synthesized in Reference Example 3 as red and green quantum dots.

[2] Production of Electronic Device

The photoconversion layer obtained in [1] is inserted between a light guide panel and an optical sheet of a 60-inch TV mounted with a blue LED having a peak emission wavelength of 449 nm, and then a color filter (manufactured from Samsung Display Co., Ltd.) is disposed on the optical sheet. The resulting TV is operated and luminance properties thereof are measured at a distance of about 45 cm with a spectro-radiometer (Konica Minolta Inc., CS-2000) to obtain a color coordinate value (Cx, Cy) and a color gamut.

The results are summarized in Table 3, Table 4, FIG. 13, FIG. 14, FIG. 15, and FIG. 16.

Figure 17:
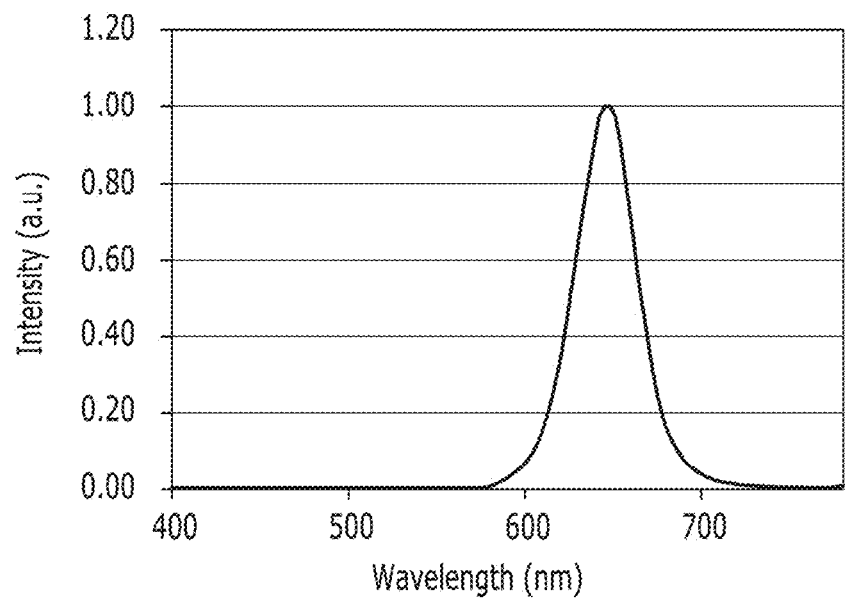
FIGS. 17 to 19 are graphs of intensity (au) versus wavelength (nm), showing the red, green, and blue (RGB) spectrums of the device of Example 1, respectively.
Figure 18:
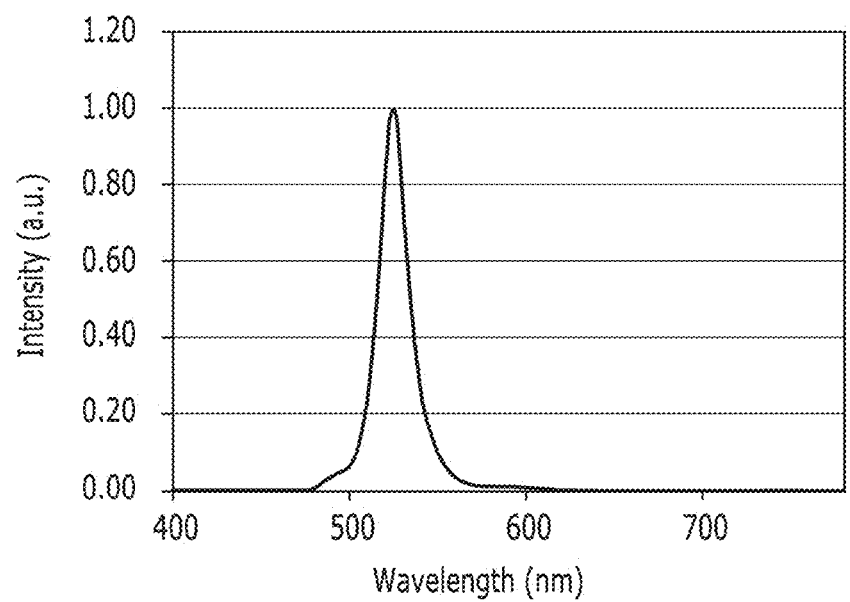
Figure 19:
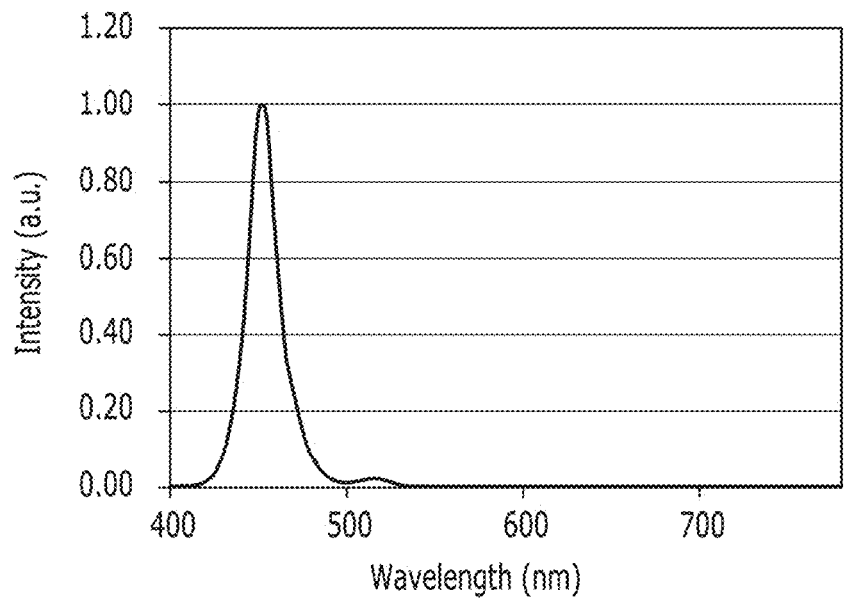

The RGB spectrums of the light emitted from the device are shown in FIG. 17 to FIG. 19.

Figure 23:
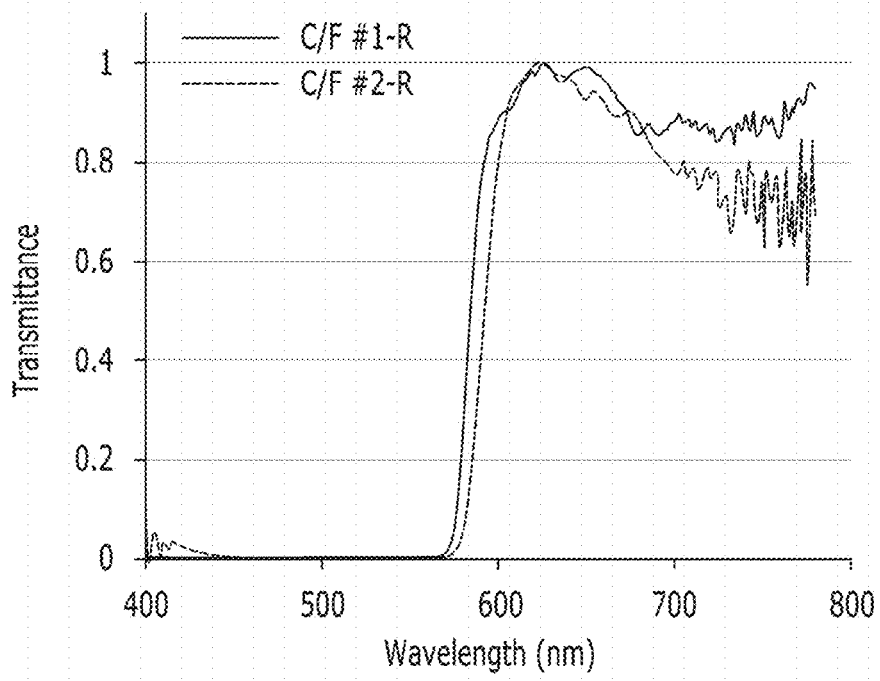
FIG. 23 is a graph of transmittance versus wavelength (nm), showing the light transmission spectrums of the red color filter used in Example 1 and the red color filter used in Comparative Example 2.
Figure 24:
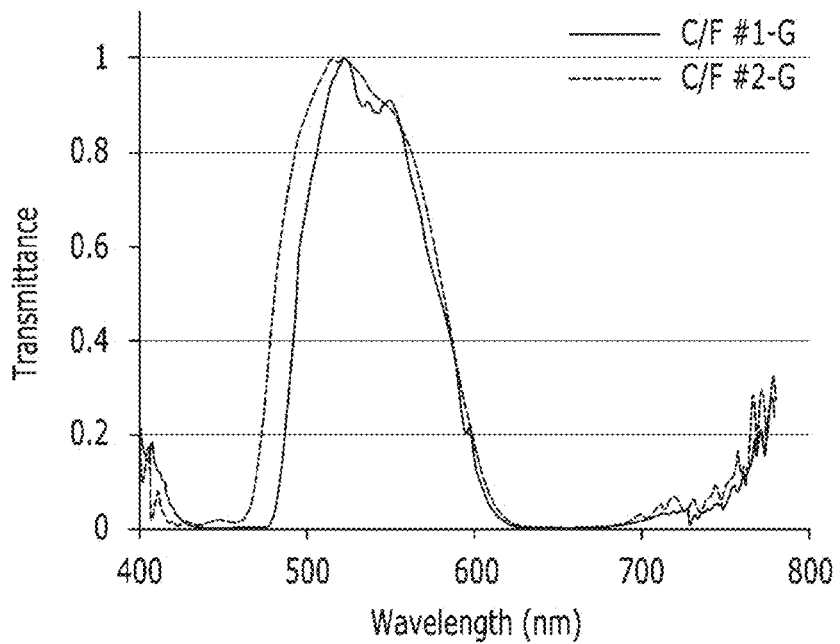
FIG. 24 is a graph of transmittance versus wavelength (nm), showing the light transmission spectrums of the green color filter used in Example 1 and the green color filter used in Comparative Example 2.
Figure 25:
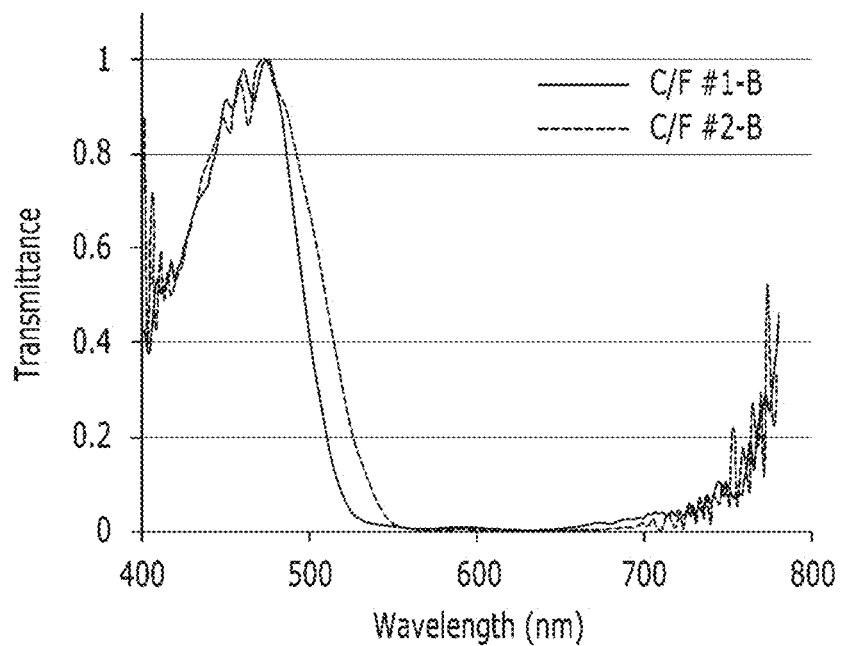
FIG. 25 is a graph of transmittance versus wavelength (nm), showing the light transmission spectrums of the blue color filter used in Example 1 and the blue color filter used in Comparative Example 2.
Figure 26:
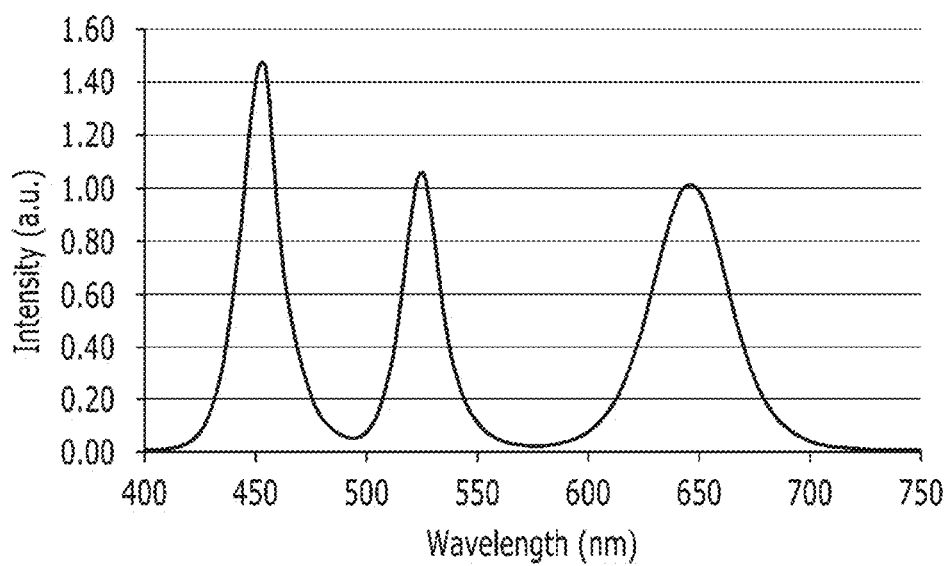
FIG. 26 is a graph of intensity (au) versus wavelength (nm), showing a light emission spectrum of the device prepared in accordance with Example 2.
Figure 27:
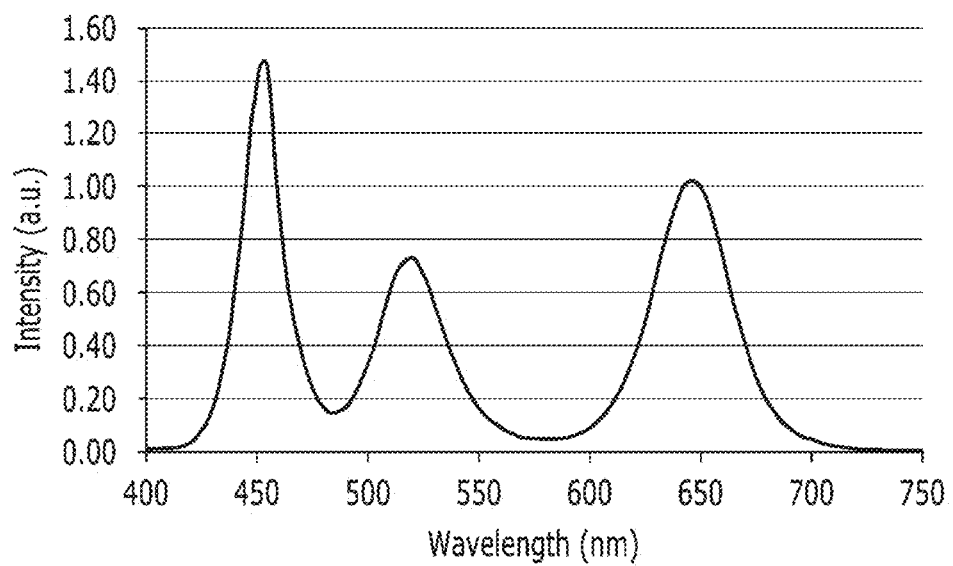
FIG. 27 is a graph of intensity (au) versus wavelength (nm), showing a light emission spectrum of the device prepared in accordance with Comparative Example 4.

For color filter 1, the red light transmittance with respect to the wavelengths of the red (R) section, the green light transmittance with respect to the wavelengths of the green (G) section, and the blue light transmittance with respect to the wavelengths of the blue (G) section, are shown in FIGS. 23 to 25, respectively.

Comparative Example 2

A device is produced in the same manner set forth in Example 1 except for using color filter 2 instead of color filter 1 (prepared from Samsung Display Co., Ltd.). The resulting TV is operated and luminance properties thereof are measured at a distance of about 45 cm with spectro-radiometer (Konica Minolta Inc., CS-2000) to obtain a color coordinate value (Cx, Cy) and a color gamut.

Figure 16:
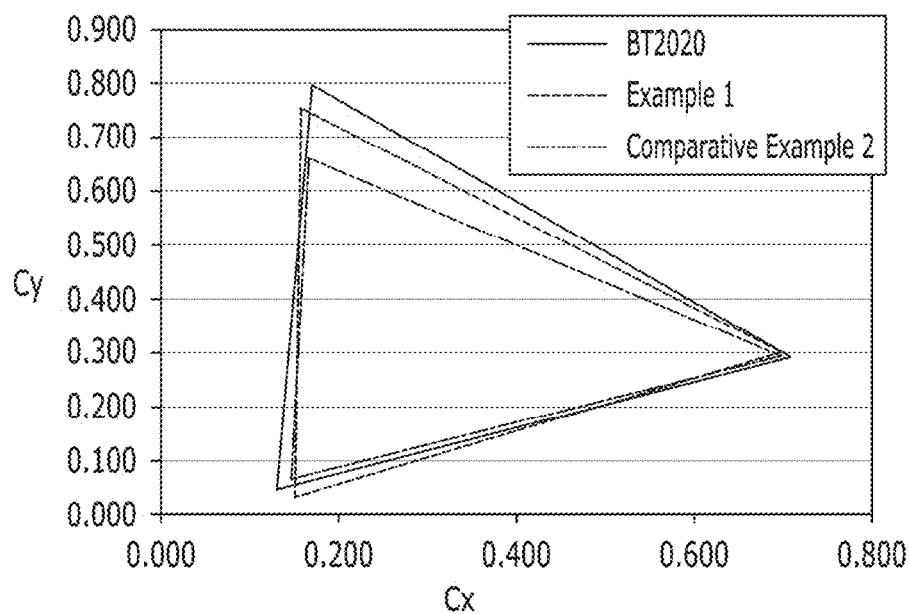
FIG. 16 is a chromaticity diagram of color coordinate values (Cx, Cy) and showing a color gamut with respect to BT2020 standard for each of the devices prepared in accordance with Comparative Example 2 and Example 1.

The results are summarized in Table 3, Table 4, and FIG. 16.

Figure 20:
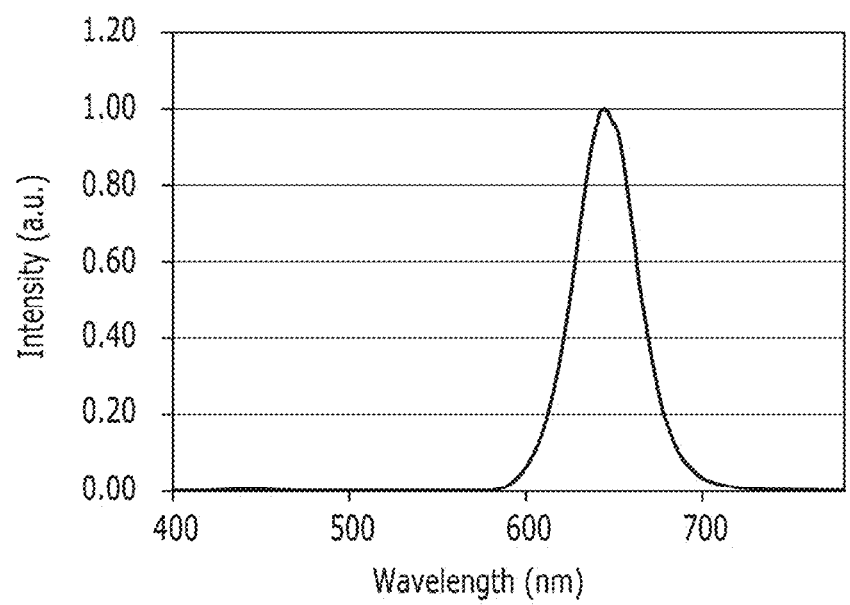
FIGS. 20 to 22 are graphs of intensity (au) versus wavelength (nm), showing the RGB spectrums of the device of Example 2, respectively.
Figure 21:
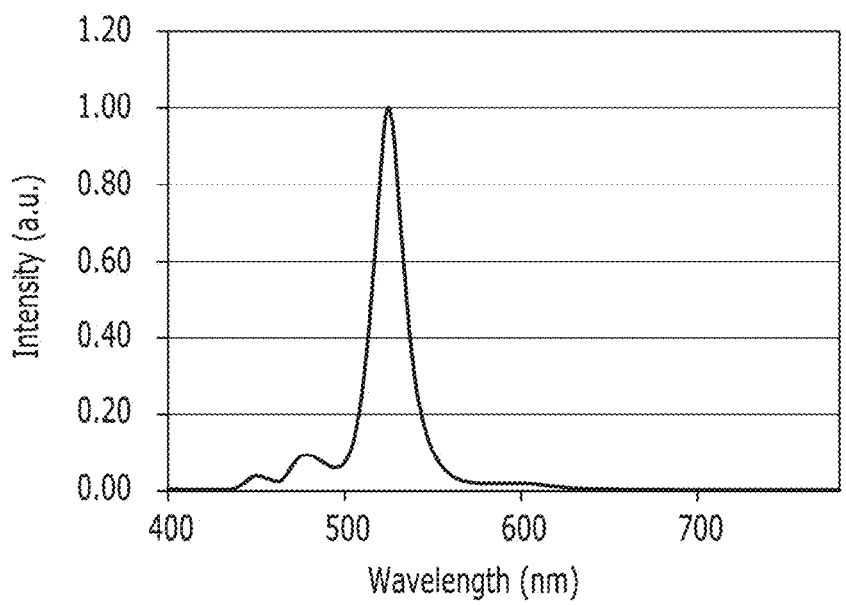
Figure 22:
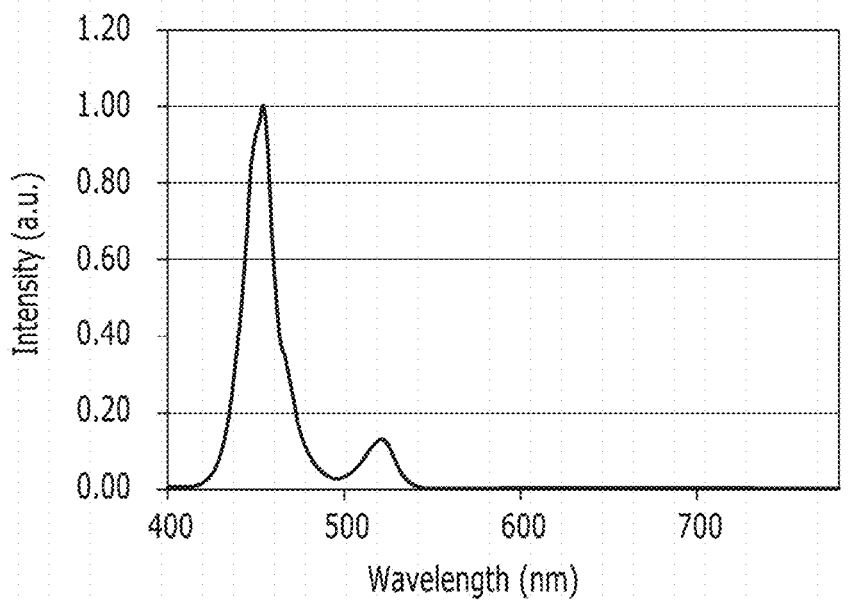

The RGB spectrums of the light emitted from the device are shown in FIG. 20 to FIG. 22.

For color filter 2, the red light transmittance with respect to the wavelengths of the red (R) section, the green light transmittance with respect to the wavelengths of the green (G) section, and the blue light transmittance with respect to the wavelengths of the blue (G) section are shown in FIGS. 23 to 25.

Comparative Example 3

A device is produced in the same manner set forth in Example 1 except for using the green quantum dot synthesized in Reference Example 1 and the red quantum dot synthesized in Reference Example 6 as red and green quantum dots. The resulting TV is operated and luminance properties thereof are measured at a distance of about 45 cm with spectro-radiometer (Konica Minolta Inc., CS-2000) to obtain a color coordinate value (Cx, Cy) and a color gamut.

Figure 33:
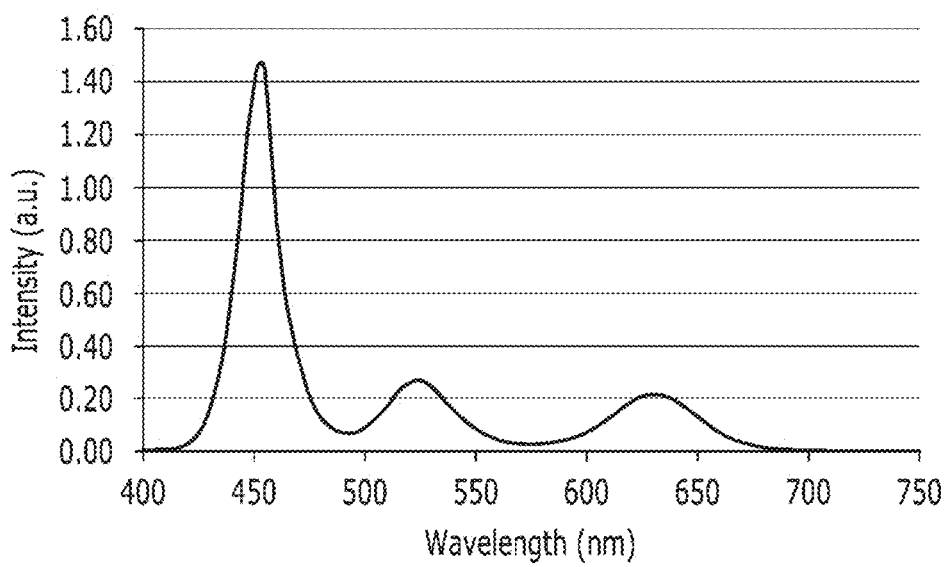
FIG. 33 is a graph of intensity (au) versus wavelength (nm), showing a light emission (RGB) spectrum of the device of Comparative Example 3.
Figure 34:
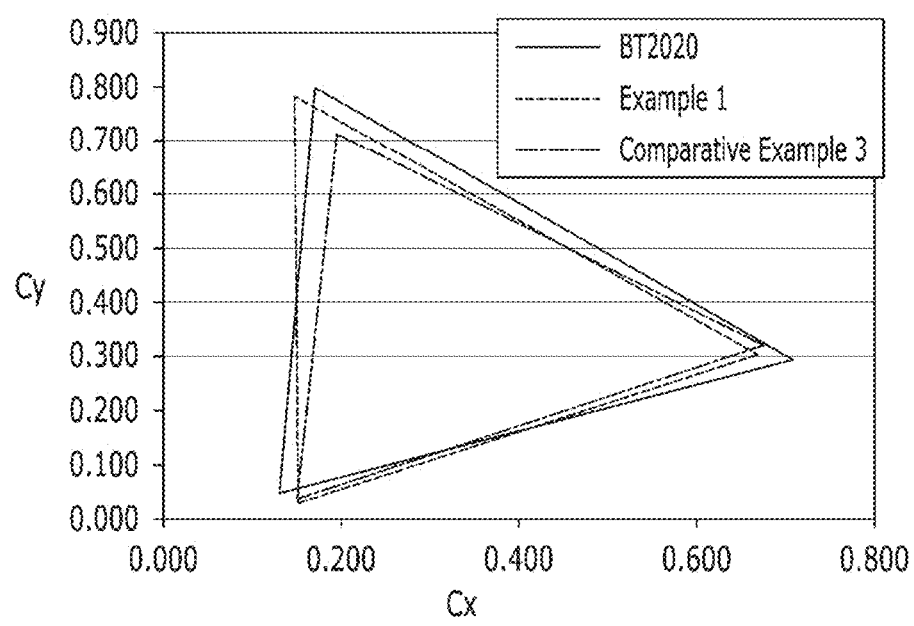
FIG. 34 is a chromaticity diagram of color coordinate values (Cx, Cy) showing a color gamut with respect to BT2020 standard for each of the devices prepared in accordance with Comparative Example 3 and Example 1.
Figure 35:
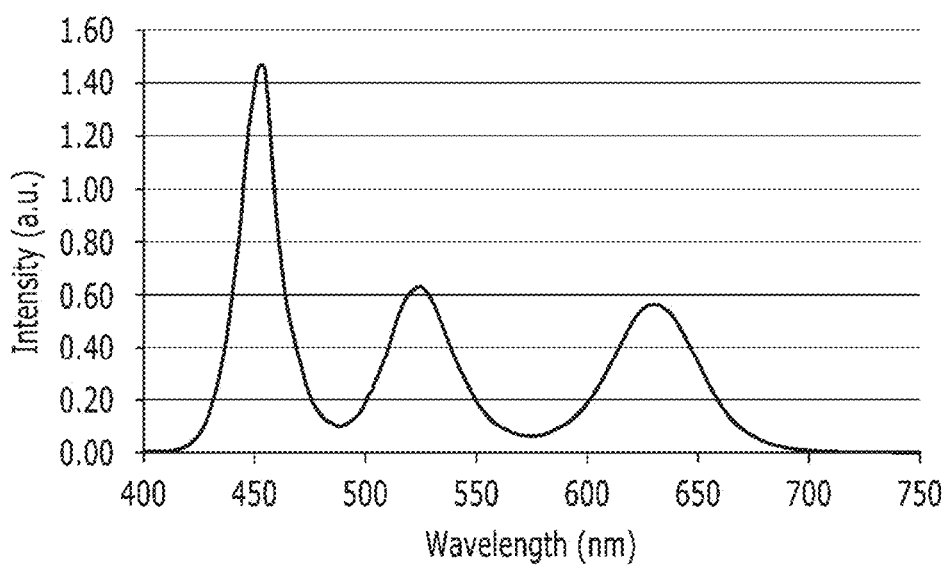
FIG. 35 is a graph of intensity (au) versus wavelength (nm), showing a light emission (RGB) spectrum of the device of Comparative Example 5.
Figure 36:
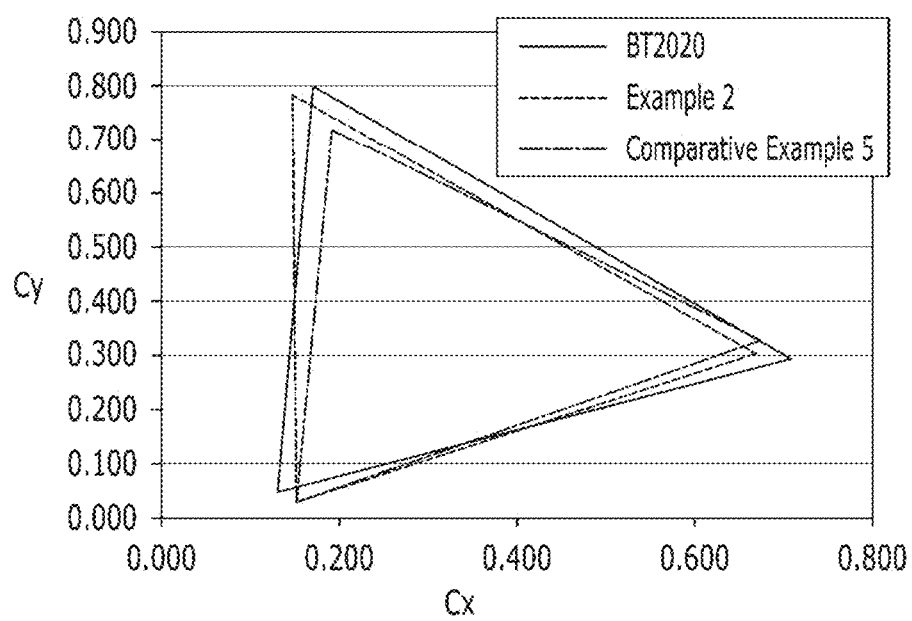
FIG. 36 is a chromaticity diagram of color coordinate values (Cx, Cy) showing a color gamut with respect to BT2020 standard for each of the devices prepared in accordance with Comparative Example 5 and Example 2.

The results are summarized in Table 3, Table 4, FIG. 33, and FIG. 34.

TABLE 3

| | Color coordinate (Cy, Cx) | | | |
|---|---|---|---|---|
| | Blue | Red | Green | White |
| Comp. EX 1 | (0.1488, 0.0381) | (0.6942, 0.3012) | (0.1616, 0.7195) | (0.2705, 0.2400) |
| EX 1 | (0.1501, 0.0337) | (0.6969, 0.2986) | (0.1574, 0.7537) | (0.2704, 0.2407) |
| Comp. EX 2 | (0.1479, 0.0653) | (0.6958, 0.2941) | (0.1667, 0.6627) | (0.2700, 0.2399) |
| Comp. EX 3 | (0.1496, 0.0349) | (0.6751, 0.3201) | (0.1950, 0.7123) | (0.2700, 0.2400) |

TABLE 4

| | Color gamut ratio (%) | | | |
|---|---|---|---|---|
| | with respect to NTSC | with respect to Adobe | with respect to DCI | with respect to BT2020 |
| Comp. EX 1 | 94.1% | 96.9% | 90.7% | 85.8% |
| EX 1 | 98.3% | 100.0% | 95.3% | 90.2% |
| Comp. EX 2 | 85.7% | 89.1% | 84.3% | 76.2% |
| Comp. EX 3 | 96.6% | 99.5% | 94.6% | 80.2% |

The results of Table 3 and Table 4, and the results of FIG. 14 and FIG. 15, confirm that the device of Example 1 having the photoconversion layer including the first quantum dot and the second quantum dot may exhibit significantly enhanced display quality in terms of the color gamut ratio in comparison with the devices of Comparative Example 1 and Comparative Example 3.

The results of FIGS. 24 to 25 confirm that in the color filter used in Example 1, the green (G) section has a normalized transmission of about zero with respect to light of a wavelength of less than or equal to about 475 nm and the blue (B) section has a normalized transmission of about zero with respect to light of a wavelength of greater than or equal to about 530 nm. The results of FIGS. 23 to 25 confirm that in the color filter used in Comparative Example 2, the green (G) section has a normalized transmission of about 0.4 with respect to light of a wavelength of less than or equal to about 475 nm and the blue (B) section has a normalized transmission of about 0.4 with respect to light of a wavelength of greater than or equal to about 510 nm.

The results of Table 3 and Table 4 and the results of FIG. 16 confirm that the device of Example 1 having the photoconversion layer of the first quantum dot and the second quantum dot may exhibit significantly enhanced display quality in terms of the color gamut ratio in comparison with the device of Comparative Example 2.

The RGB spectrums of FIGS. 17 to 19 confirm that when the light is emitted from the photoconversion layer of the device of Example 1 and passes through the second color section, the spectrum does not include an emission peak having an normalized intensity of greater than about 0.07 at a wavelength of less than about 500 nm and when the light is emitted from the photoconversion layer of the device of Example 1 and passes through the third color section, the spectrum does not include an emission peak having an normalized intensity of greater than about 0.05 at a wavelength of greater than about 500 nm.

The RGB spectrums of FIGS. 20 to 22 confirm that when the light is emitted from the photoconversion layer of the device of Comparative Example 2 and passes through the second color section, the spectrum includes an emission peak having an normalized intensity of greater than about 0.095 at a wavelength of less than about 500 nm and when the light is emitted from the photoconversion layer of the device of Comparative Example 2 and passes through the third color section, the spectrum includes an emission peak having an normalized intensity of greater than about 0.128 at a wavelength of greater than about 500 nm.

Example 2

Figure 28:
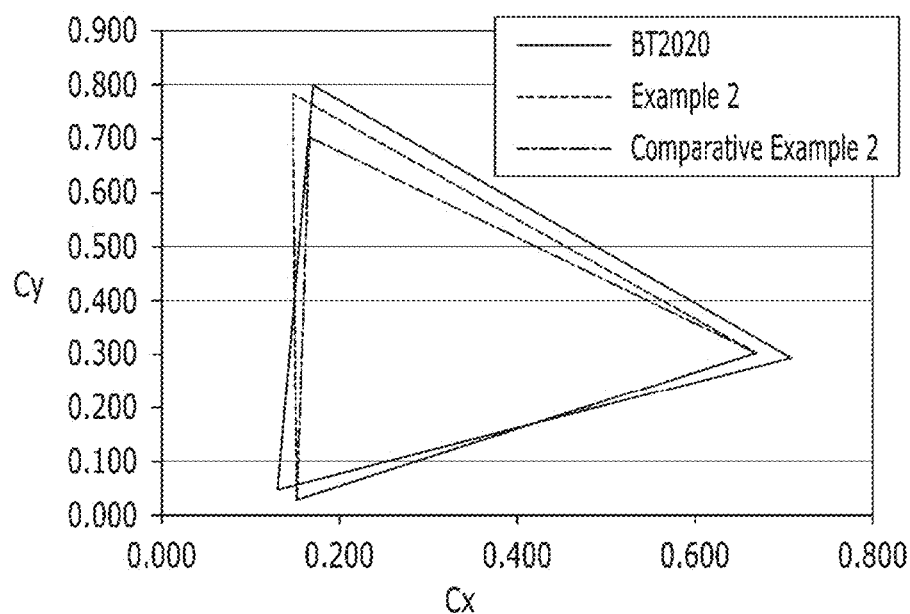
FIG. 28 is a chromaticity diagram of color coordinate values (Cx, Cy) showing a color gamut with respect to BT2020 standard for each of the devices prepared in accordance with Comparative Example 4 and Example 2.
Figure 29:
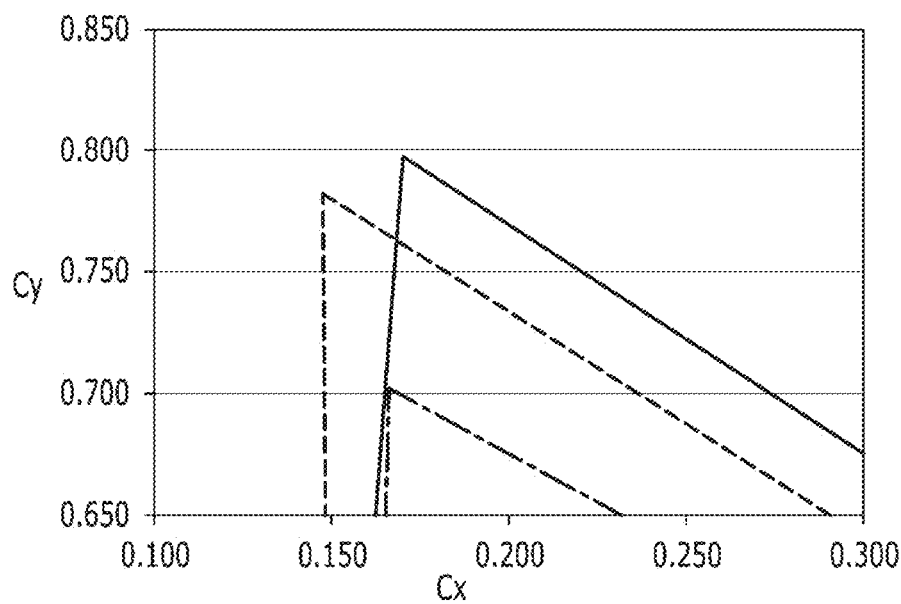
FIG. 29 is a chromaticity diagram of color coordinate values (Cx, Cy) having a Cy value of greater than or equal to about 0.65 and a Cx value of 0.10 to 0.30, showing a color gamut with respect to BT2020 standard for each of the devices prepared in accordance with Comparative Example 4 and Example 2.
Figure 30:
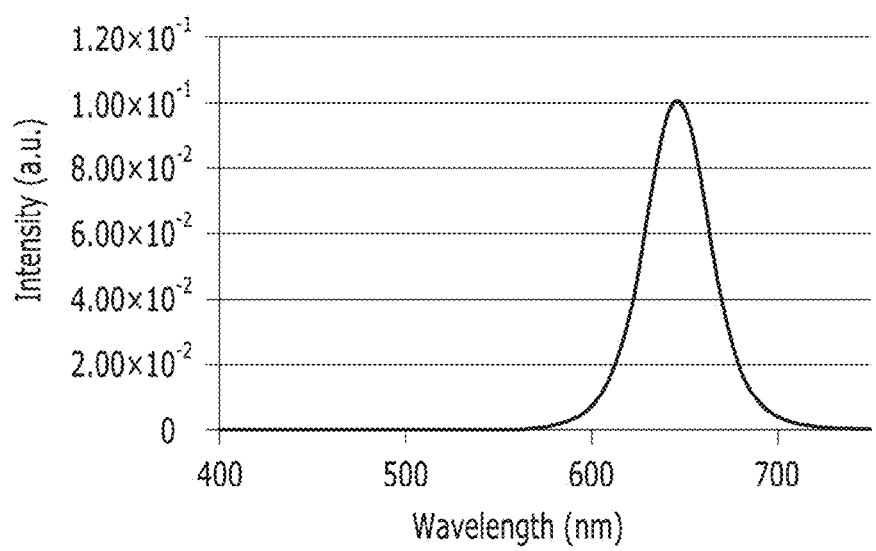
FIGS. 30 to 32 are graphs of intensity (au) versus wavelength (nm) showing the RGB spectrums of the device of Example 2, respectively.
Figure 31:
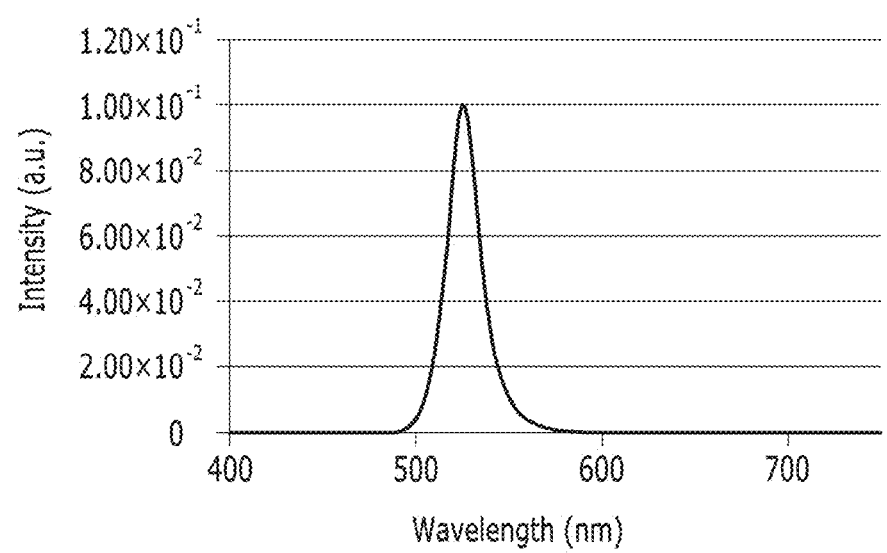
Figure 32:
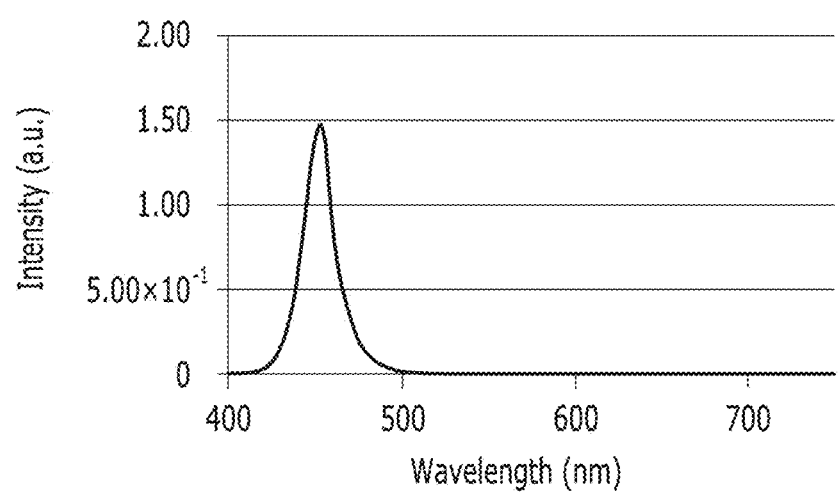

A pattern including the red quantum dot (R QD) synthesized in Reference Example 2, a pattern including the green perovskite quantum dot (G PQD) synthesized in Reference Example 3, a device including these patterns are simulated using an EXCEL program and based on the photoluminescent spectrums of the quantum dots measured by the spectrometer, the color coordinates (Cx, Cy) of the light emitted from the device are calculated, and the results are summarized in Table 5, Table 6, FIG. 28, and FIG. 29.

Comparative Example 4

A pattern including the red quantum dot (R QD) synthesized in Reference Example 2, a pattern including the green quantum dot (G QD) synthesized in Reference Example 1, a device including these patterns are simulated using an EXCEL program and based on the photoluminescent spectrums of the quantum dots measured by the spectrometer, the color coordinates (Cx, Cy) of the light emitted from the device are calculated and the results are summarized in Table 5, Table 6, FIG. 28, and FIG. 29.

Comparative Example 5

A pattern including the red perovskite quantum dot (R PQD) synthesized in Reference Example 6, a pattern including the green quantum dot (G QD) synthesized in Reference Example 1, a device including these patterns are simulated with using EXCEL program and based on the photoluminescent spectrums of the quantum dots measured by the spectrometer, the color coordinates (Cx, Cy) of the light emitted from the device are calculated and the results are summarized in Table 5, Table 6, FIG. 28, and FIG. 29.

TABLE 5

| | Color Coordinates (Cy, Cx) | | | |
|---|---|---|---|---|
| | Blue | Red | Green | White |
| EX 2 | (0.1519, 0.0288) | (0.6671, 0.3023) | (0.1476, 0.7820) | (0.2700, 0.2401) |
| Comp. EX 4 | (0.1519, 0.0288) | (0.6671, 0.3023) | (0.1660, 0.7021) | (0.2700, 0.2398) |
| Comp. EX 5 | (0.1519, 0.0288) | (0.6730, 0.3268) | (0.1920, 0.7157) | (0.2700, 0.2400) |

TABLE 6

| | Color gamut ratio (%) | | | |
|---|---|---|---|---|
| | with respect to NTSC | with respect to NTSC | with respect to NTSC | with respect to NTSC |
| EX 2 | 96.9% | 99.9% | 93.9% | 88.5% |
| Comp. EX 4 | 89.0% | 92.9% | 87.0% | 79.4% |
| Comp. EX 5 | 97.3% | 99.5% | 95.1% | 80.5% |

The results of Table 5, Table 6, FIG. 28 and FIG. 29 confirm that the electronic device of Example 2 may show further enhanced color gamut ratio in comparison with those of the devices and Comparative Examples 4 and 5.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:
1. An electronic device comprising:
a light source having a peak emission at a wavelength of about 440 nanometers to about 480 nanometers; and
a photoconversion layer disposed on the light source, wherein the photoconversion layer comprises a first quantum dot, which emits red light, and a second quantum dot, which emits green light,
wherein at least one of the first quantum dot and the second quantum dot is a perovskite quantum dot having a perovskite crystal structure and the perovskite quantum dot comprises a compound represented by Chemical Formula 1:

$$AB'X_{3+\alpha} \qquad \text{Chemical Formula 1}$$

wherein A is a Group IA metal selected from Rb, Cs, Fr, and a combination thereof, $NR_4^+$, wherein each R is independently a hydrogen atom or a substituted or unsubstituted C1 to C10 straight chain or branched chain alkyl group, $[CH(NH_2)_2]^+$, or a combination thereof; B' is a Group IVA metal selected from Si, Ge, Sn, Pb, and a combination thereof; X is a halogen selected from F, Cl, Br, I, and a combination thereof, $BF_4^-$, or a combination thereof, and α is 0 to 3, and
wherein the perovskite quantum dot comprises a greater amount of halogen than a stoichiometric amount for a perovskite crystal.
2. The electronic device of claim 1, wherein the photoconversion layer comprises a polymer matrix, and the first quantum dot and the second quantum dot are dispersed in the polymer matrix.
3. The electronic device of claim 1, wherein a peak emission wavelength of the red light is of about 620 nanometers to about 650 nanometers and α peak emission wavelength of the green light is of about 500 nanometers to about 550 nanometers.
4. The electronic device of claim 1, wherein at least one of the first quantum dot and the second quantum dot comprises a non-perovskite quantum dot not having a perovskite crystal structure and the non-perovskite quantum dot comprises a Group II-VI compound, a Group III-V compound, a Group IV-VI compound, a Group IV element, a Group IV compound, a Group compound, a Group I-II-IV-VI compound, or a combination thereof.
5. The electronic device of claim 1, wherein in the perovskite quantum dot comprises the compound represented by Chemical Formula 1 in which A is the Group IA metal and X is the halogen, and an atomic ratio of the halogen to the Group IA metal is greater than 3 as measured by transmission electron microscope-energy dispersive X-ray spectroscopy.
6. The electronic device of claim 1, wherein the perovskite quantum dot further comprises at least one of a first dopant and α second dopant, wherein the first dopant comprises potassium or a first metal having a crystal ionic radius of less than about 133 picometers and which is different from the Group IVA metal and, if present, the Group IA metal, and the second dopant comprises a non-metal element which forms a bond with the Group IVA metal.
7. The electronic device of claim 6, wherein the first metal comprises Zn, Cd, Hg, Ga, In, Tl, Cu, Al, Li, Na, Be, Mg, Ca, Sr, Ag, Pt, Pd, Ni, Co, Fe, Cr, Zr, Mn, Ti, Ce, Gd, or a combination thereof, and the non-metal element comprises S, Se, Te, or a combination thereof.
8. The electronic device of claim 6, wherein the perovskite quantum dot comprises the first dopant, and an amount of the first dopant is greater than or equal to about 0.001 parts per million as measured by inductively coupled plasma-atomic emission spectroscopy.
9. The electronic device of claim 6, wherein the perovskite quantum dot comprises the second dopant, and an amount of the second dopant is greater than or equal to about 0.001 parts per million as measured by inductively coupled plasma-atomic emission spectroscopy.

10. The electronic device of claim 1, wherein the first quantum dot and the second quantum dot each independently comprise an organic ligand compound on a surface thereof, wherein the organic ligand compound is selected from RCOOH, $RNH_2$, $R_2NH$, $R_3N$, RSH, $R_3PO$, $R_3P$, ROH, RCOOR', $RPO(OH)_2$, $R_2POOH$, and RCOOCOR', wherein, R and R' are independently a substituted or unsubstituted C1 to C24 aliphatic hydrocarbon group or a substituted or unsubstituted C5 to C24 aromatic hydrocarbon group, and a combination thereof.

11. The electronic device of claim 1, wherein the electronic device is configured to emit light having a color gamut ratio of at least about 80% with respect to BT2020 in a CIE1931 color space.

12. The electronic device of claim 1, wherein the electronic device is configured to emit light having a color gamut ratio of at least about 87% with respect to BT2020 in a CIE1931 color space.

13. The electronic device of claim 1, wherein the photoconversion layer is configured such that green light emitted from the photoconversion layer has a color coordinate Cy value of greater than or equal to about 0.73.

14. The electronic device of claim 1, wherein the electronic device further comprises a liquid crystal panel, and the liquid crystal panel comprises a lower substrate, an upper substrate, and a liquid crystal layer interposed between the upper and lower substrates.

15. The electronic device of claim 14, wherein the liquid crystal panel comprises an absorption color filter,
the photoconversion layer is configured to emit white light, and
the liquid crystal panel is disposed on the photoconversion layer such that the white light passes through the liquid crystal panel.

16. The electronic device of claim 15, wherein the absorption color filter has a first color section configured for passing red light, a second color section configured for passing green light, and a third color section configured for passing blue light,
wherein a light emitted from the photoconversion layer and passing through the second color section has a spectrum which does not include an emission peak having a normalized intensity of greater than or equal to about 0.1 at a wavelength of less than about 500 nanometers, and wherein a light emitted from the photoconversion layer and passing through the third section has a spectrum which does not include an emission peak having an a normalized intensity of greater than or equal to about 0.15 at a wavelength of greater than about 500 nanometers.

17. The electronic device of claim 14, wherein the liquid crystal panel does not comprise an absorption color filter, and the photoconversion layer is disposed on a top surface or a bottom surface of the upper substrate of the liquid crystal panel.

18. The electronic device of claim 17, wherein the photoconversion layer has a pattern comprising a first color section configured to emit red light, a second color section configured to emit green light, and a third color section configured to pass or emit blue light.

19. The electronic device of claim 18, wherein the red light has a maximum peak emission wavelength of about 620 nanometers to about 650 nanometers and the green light has a maximum peak emission wavelength of about 530 nanometers to about 550 nanometers.

20. The electronic device of claim 19, wherein the first color section comprises the first quantum dot and the second color section comprises the second quantum dot.

* * * * *